(12) United States Patent
Barberi et al.

(10) Patent No.: US 6,327,017 B2
(45) Date of Patent: Dec. 4, 2001

(54) BISTABLE LIQUID CRYSTAL DISPLAY DEVICE IN WHICH NEMATIC LIQUID CRYSTAL HAS MONOSTABLE ANCHORINGS

(75) Inventors: Ricardo Barberi, Arcavacata di Rende (IT); Ivan Dozov, Gif-sur-Yvette (FR); Georges Durand, Orsay (FR); Philippe Martinot-Lagarde, Marcoussis (FR); Maurizio Nobili, Pessac (FR); Eric Polossat, Montpellier (FR); Ioannis Lelidis, Lausanne (CH); Michele Giocondo, Arcavacata di Rende (IT)

(73) Assignee: Nemoptic S.A. (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,078
(22) PCT Filed: Nov. 8, 1996
(86) PCT No.: PCT/FR96/01771
  § 371 Date: Sep. 14, 1998
  § 102(e) Date: Sep. 14, 1998
(87) PCT Pub. No.: WO97/17632
  PCT Pub. Date: May 15, 1997

(30) Foreign Application Priority Data

Nov. 8, 1995 (FR) .................................................. 95 13201
Apr. 10, 1996 (FR) .................................................. 96 04447

(51) Int. Cl.[7] .................................................. C09K 19/02
(52) U.S. Cl. .................................................. 349/177
(58) Field of Search ........................... 349/33, 177, 179, 349/173

(56) References Cited

U.S. PATENT DOCUMENTS

| | | | |
|---|---|---|---|
| 4,941,736 | * 7/1990 | Taniguchi et al. | 349/173 |
| 5,040,876 | 8/1991 | Patel et al. . | |
| 5,221,980 | * 6/1993 | Yamamoto et al. | 349/173 |
| 5,357,358 | * 10/1994 | Durand et al. | 349/125 |
| 5,530,566 | * 6/1996 | Kumar | 349/171 |
| 5,796,459 | * 8/1998 | Bryan-Brown et al. | 349/177 |
| 5,995,173 | * 11/1999 | Barberi et al. | 349/33 |

FOREIGN PATENT DOCUMENTS

| | | |
|---|---|---|
| 018180 | 10/1980 | (EP) . |
| 2 587 506 | 3/1987 | (FR) . |

OTHER PUBLICATIONS

Liquid Crystals, Aug. 1991, U.K. vol. 10, No. 2, pp. 289–293 "Flow Induced Bistable Anchoring Switching In Nematic Liquid Crystals".
Journal of Applied Physics, Apr. 1981, vol. 52, No. 4.
Applied Physics Letters, Dec. 11, 1989 vol. 55, No. 24.
Applied Physics Letters, Mar. 2, 1992, vol. 60, No. 9.

* cited by examiner

*Primary Examiner*—Walter J. Malinowski
(74) *Attorney, Agent, or Firm*—Blakely Kokoloff Taylor & Zafman

(57) ABSTRACT

A display device including two parallel transparent plates (10, 12) having transparent electrodes on the inner surfaces thereof and containing a liquid crystal material (20). The device includes means defining a monostable anchoring for each plate (10, 12), means (40) controllable to break at least one of the anchorings, and means for thereafter inducing volume bistability.

65 Claims, 19 Drawing Sheets

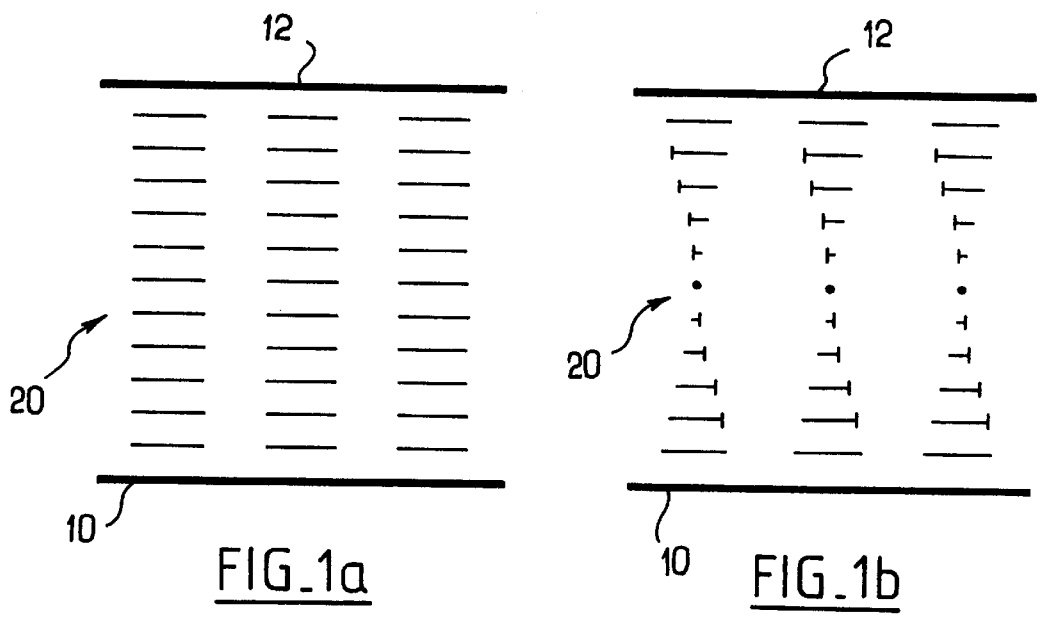
FIG_1a    FIG_1b
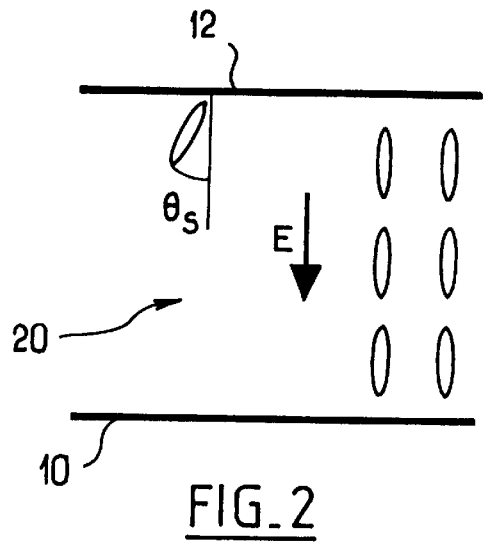
FIG_2
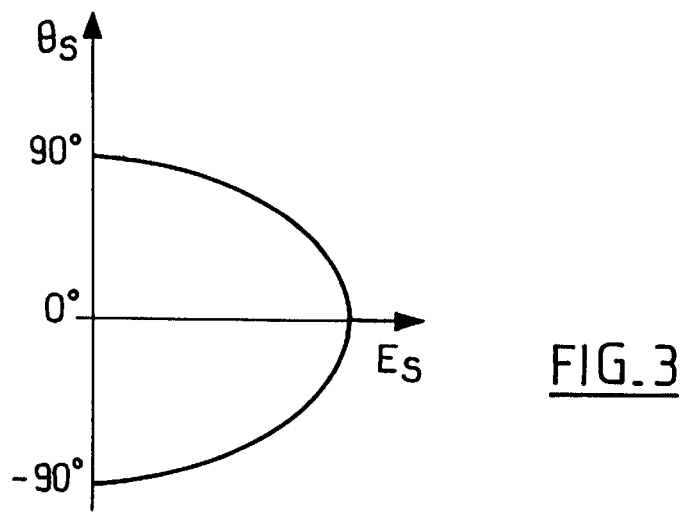
FIG_3

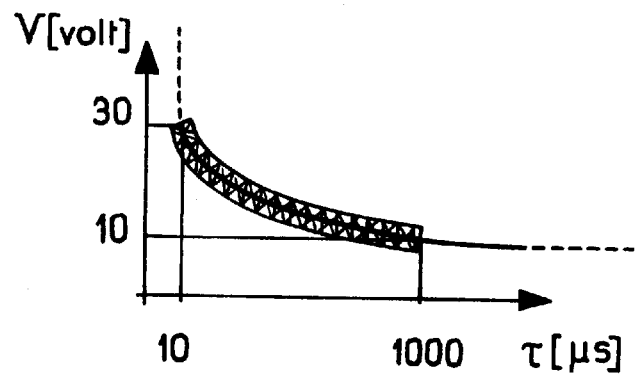
FIG_4
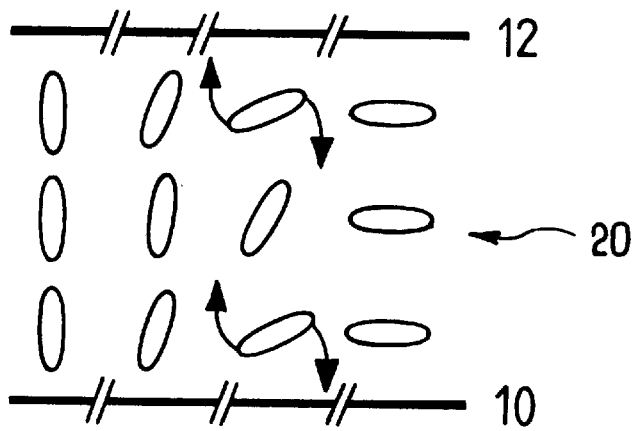
FIG 5a  FIG.5b  FIG 5c  FIG.5d
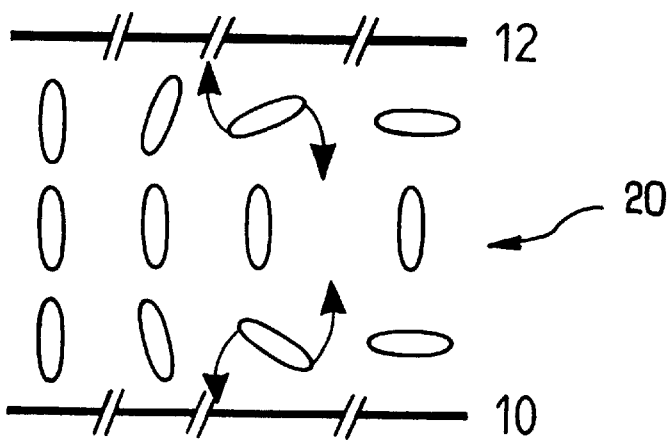
FIG.6a  FIG.6b  FIG.6c  FIG.6d

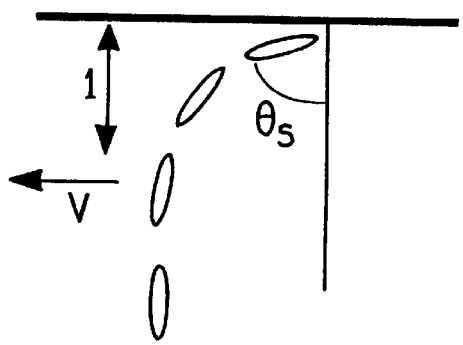
FIG_7
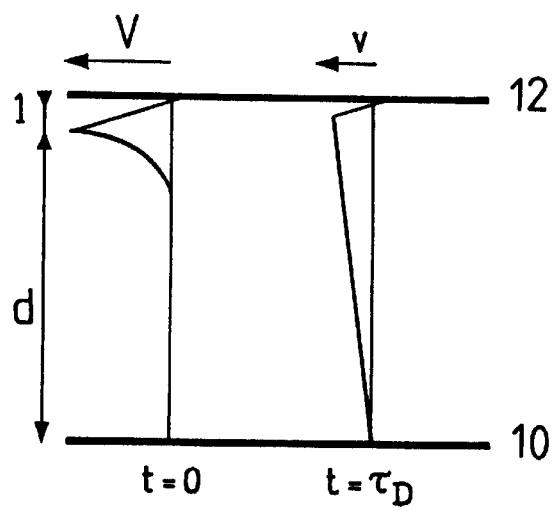
FIG_8
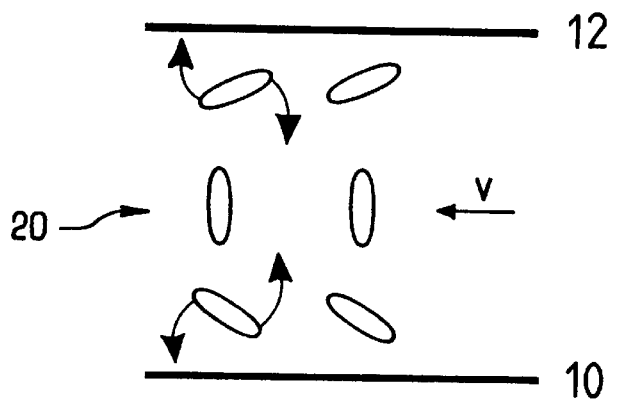
FIG_9

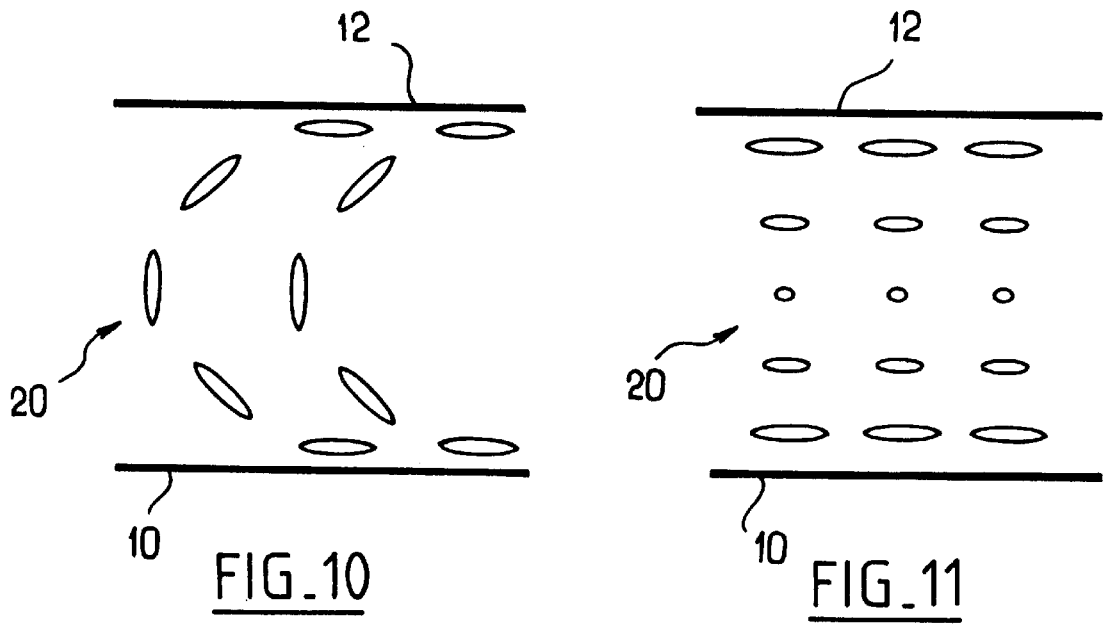
FIG_10   FIG_11
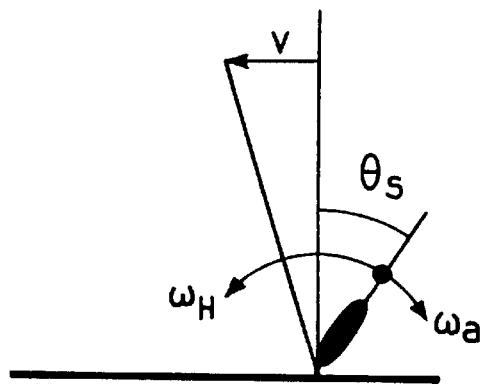
FIG_12
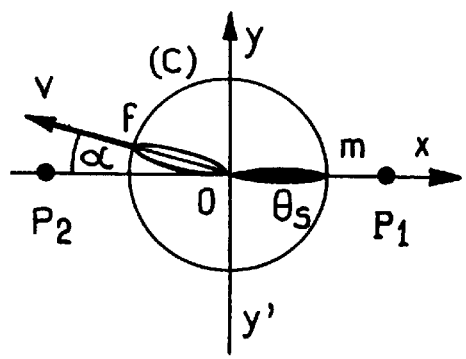
FIG_13

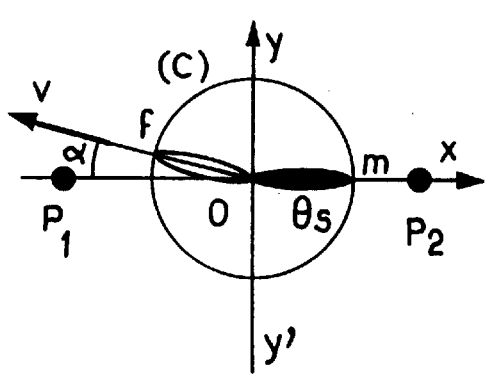
FIG_14
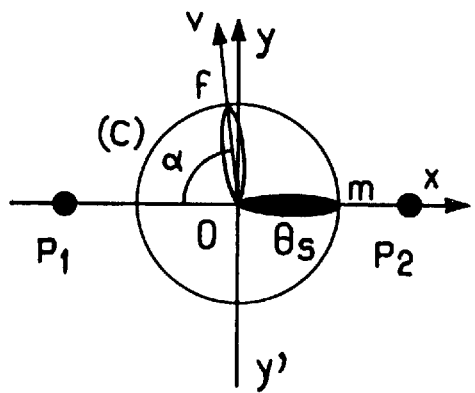
FIG_15
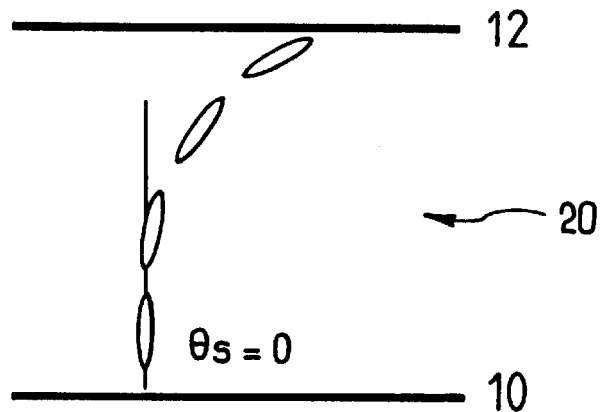
FIG_16
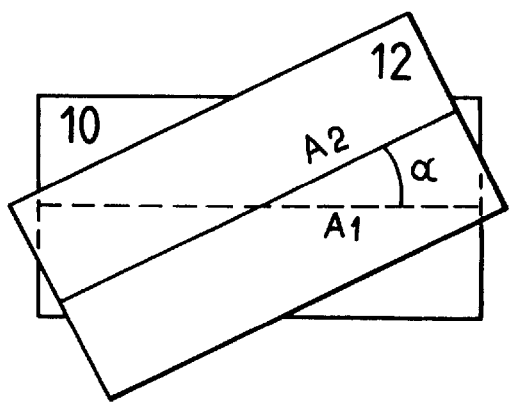
FIG_17

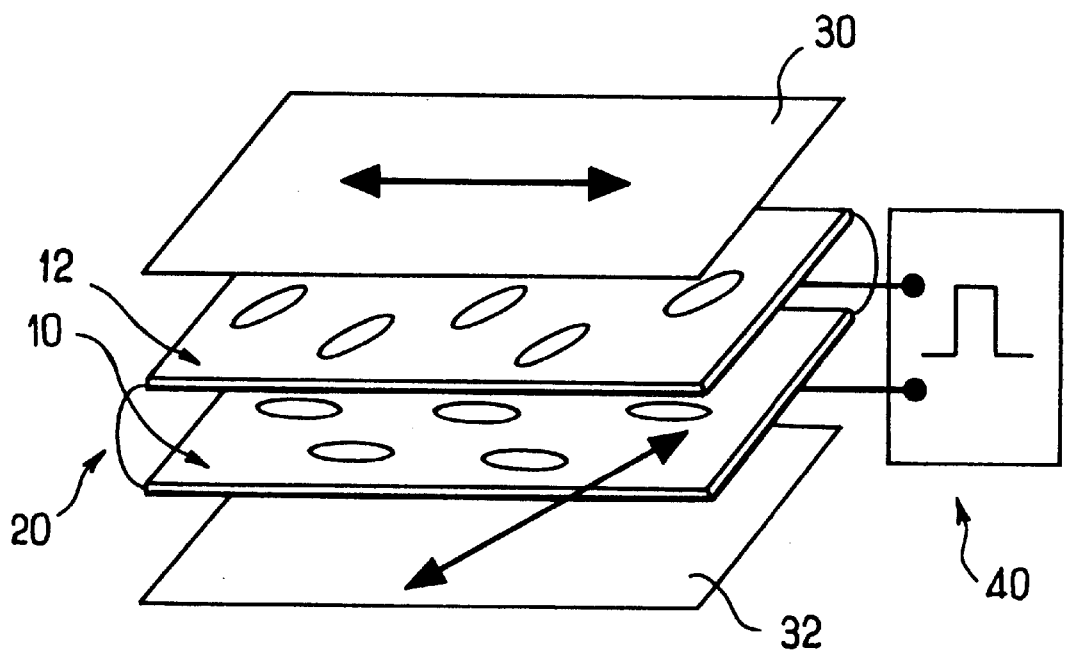
FIG_18
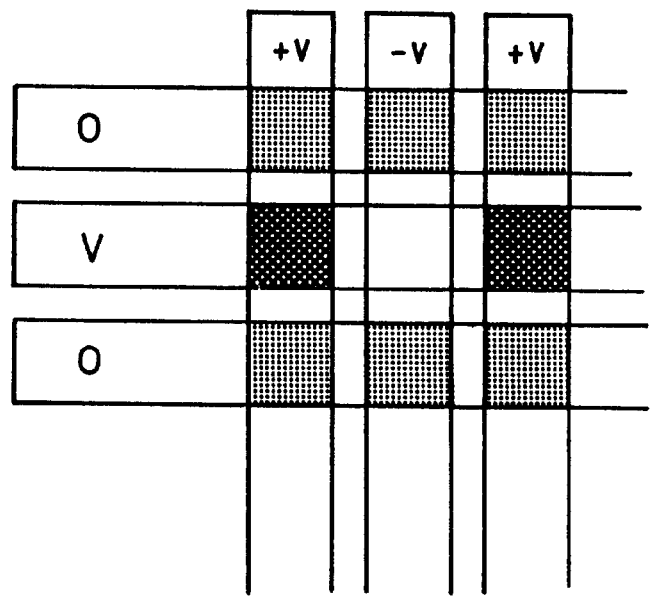
FIG_19

FIG.25        FIG.26        FIG.27
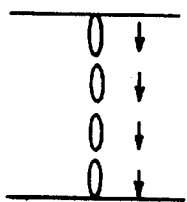
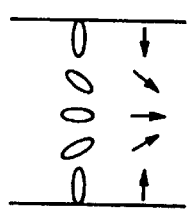
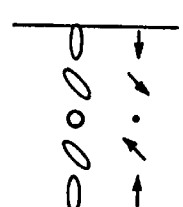
FIG.28        FIG.29        FIG.30
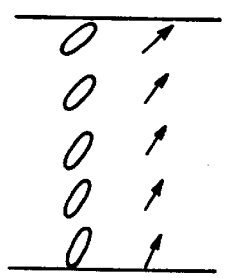
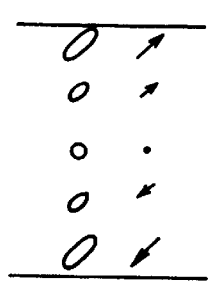
FIG.31        FIG.32

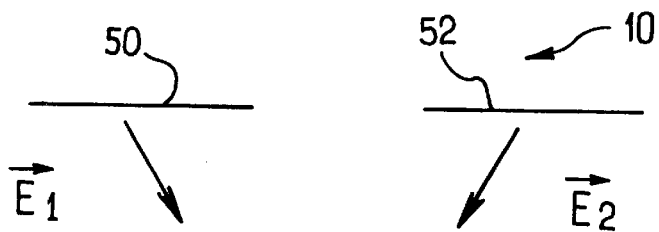
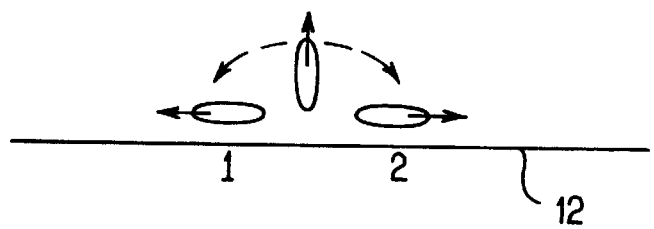
FIG_33
FIG_34  FIG_35
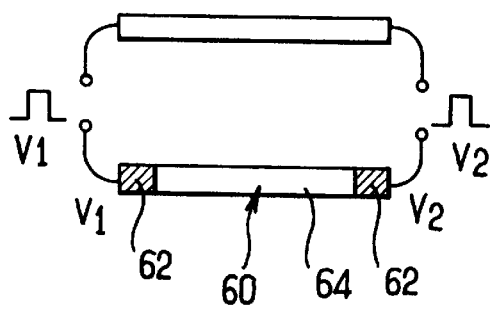
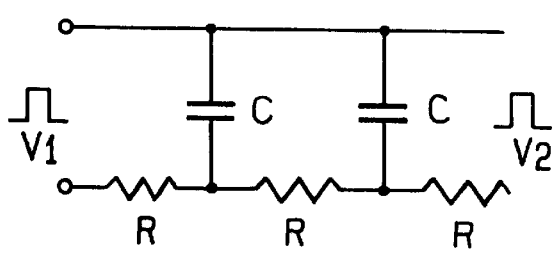
FIG_36
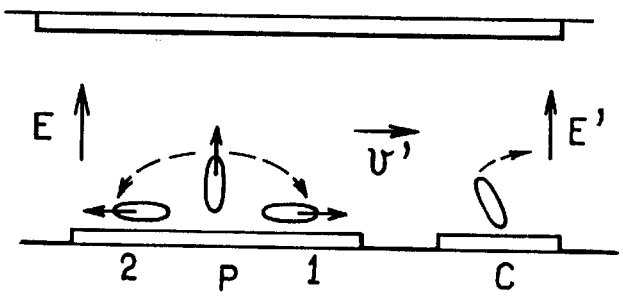

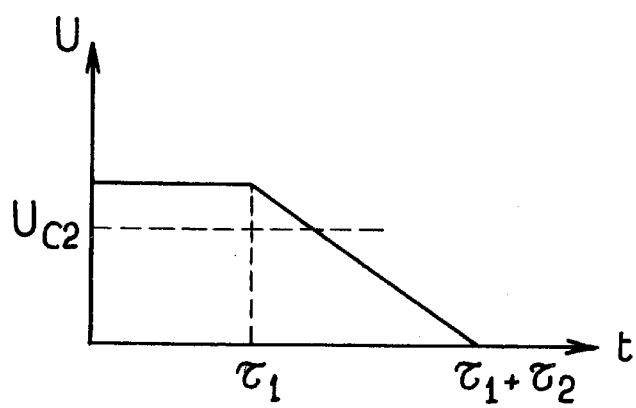
FIG_40
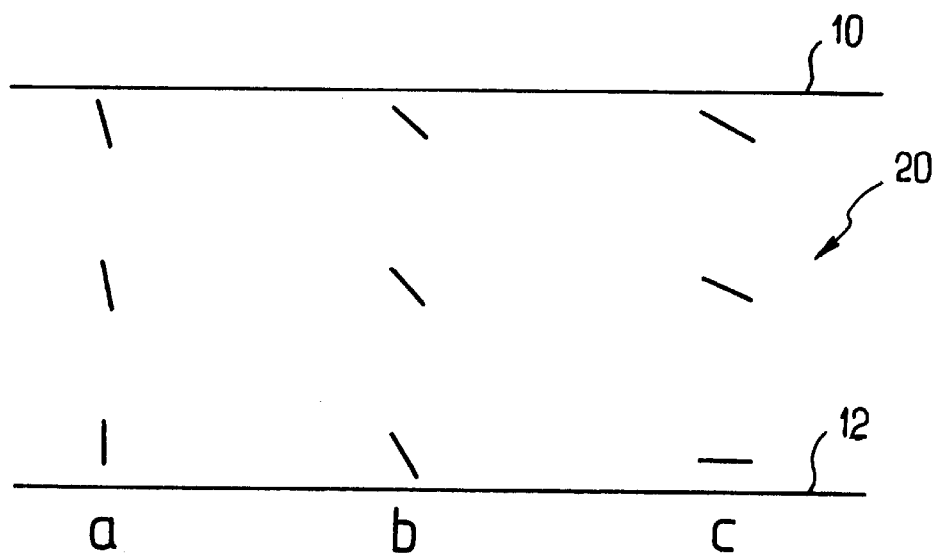
FIG_41
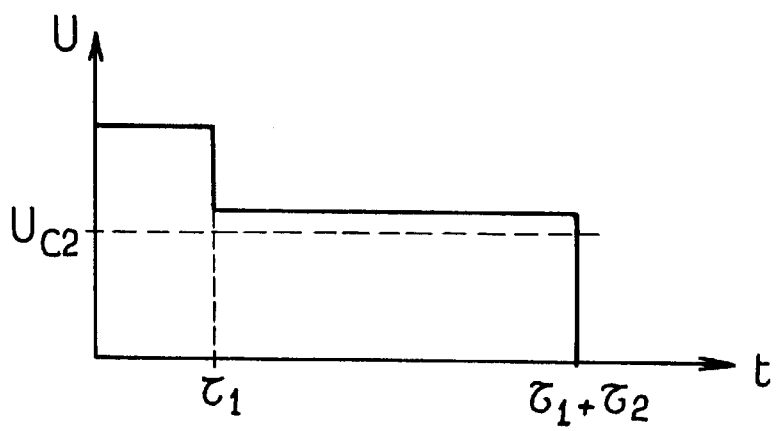
FIG_42

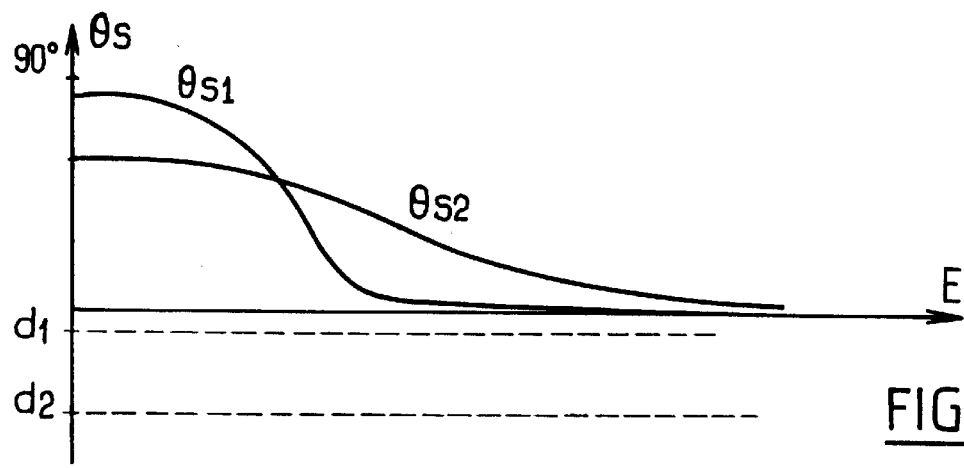
FIG_46
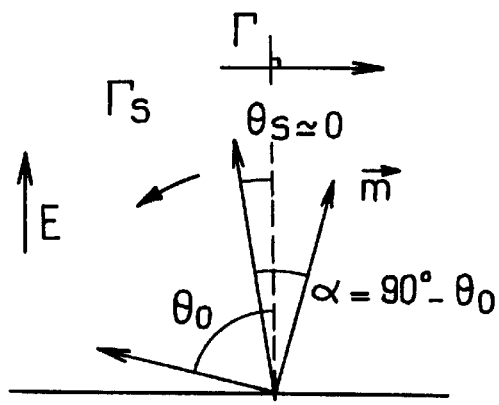
FIG_47
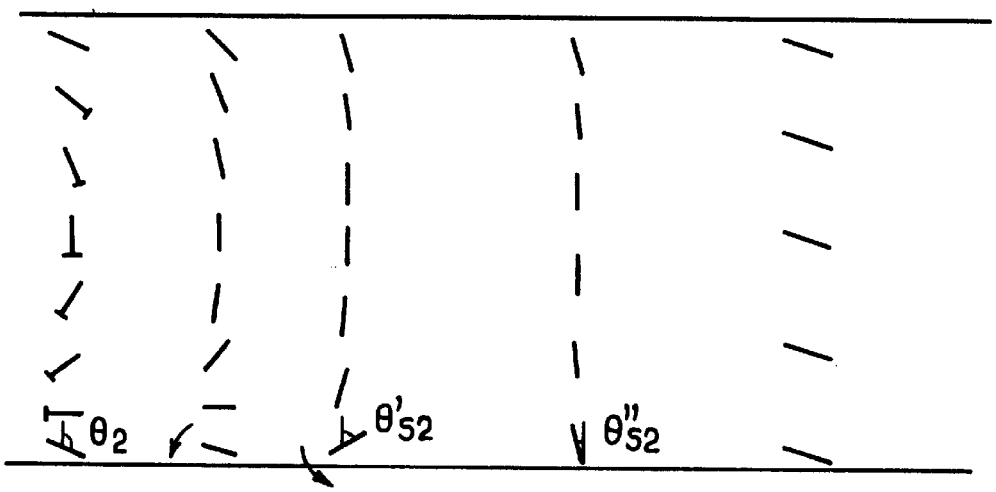
FIG_48a   FIG_48b   FIG_48c   FIG_48d   FIG_48e

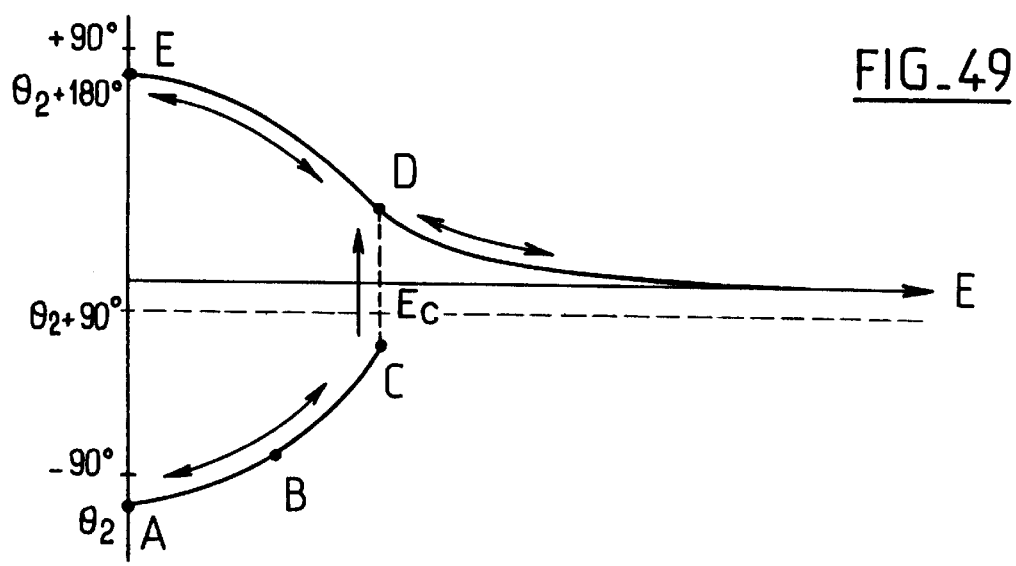
FIG_49
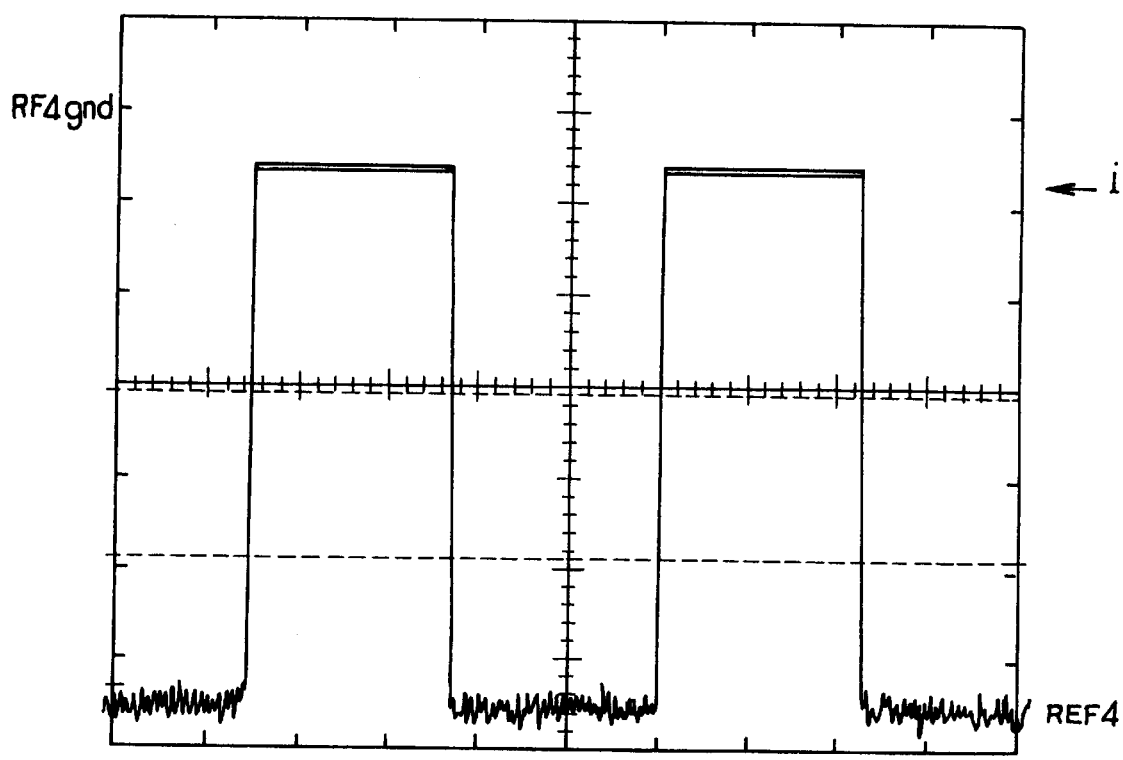
FIG_51

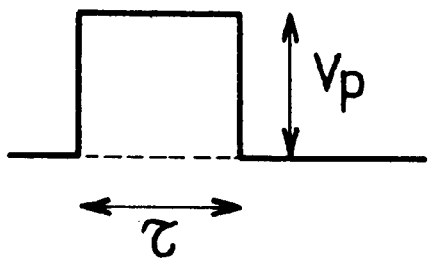
FIG._57
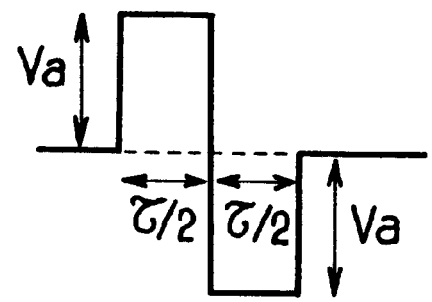
FIG._58
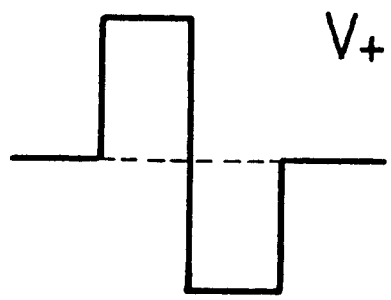
FIG._59
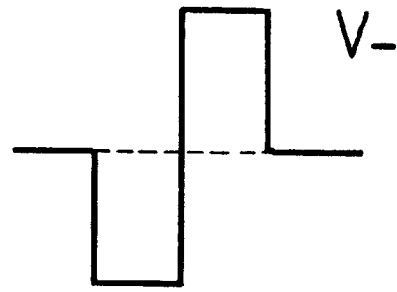
FIG._60

BISTABLE LIQUID CRYSTAL DISPLAY DEVICE IN WHICH NEMATIC LIQUID CRYSTAL HAS MONOSTABLE ANCHORINGS

BACKGROUND

The present invention relates to the field of liquid-crystal-based display devices.

More precisely, the present invention relates to the field of display devices having a bistable effect.

Liquid-crystal-based display devices have already given rise to a vast literature.

Mention may be made for example, in a non-limiting manner, of the following documents:

(1) Europhysics Letters (25) (7), p 527–531 "Critical Behaviour of a Nematic-Liquid-Crystal Anchoring at a Monostable-Bistable Surface Transition" by M. Nobili et al.;

(2) J. Phys. II France 5 (1995), p 531–560 "Surface Walls on a Bistable Anchoring of Nematic Liquid Crystals" by M. Nobil et al.;

(3) Liquid Crystals 1992, vol. 12, No. 3, p 515–520 "Dynamics of surface anchoring breaking in a nematic liquid crystal" by A. Gharbi et al.;

(4) Liquid Crystals 1991, vol. 10, No. 2, p 289–293 "Flow induced bistable anchoring switching in nematic liquid crystals" by R. Barberi et al., which describes bistable-anchoring devices;

(5) Appl. Phys. Letters 55 (24) "Electrically Controlled surface bistability in nematic liquid crystals" by R. Barberi et al., which describes bistable-anchoring devices;

(6) Appl. Phys. Letters 60 (9) "Flexoelectrically controlled surface bistable switching in nematic liquid crystals" by R. Barberi et al.;

(7) Appl. Phys. Letters (62) (25) "Intrinsic multiplexability of surface bistable nematic displays" by R. Barberi et al., (8) Appl. Phys. Letters 40 (11) "A Multiplexible bistable nematic liquid crystal display using thermal erasure" by G. D. Boyd et al.;

(9) Appl. Phys. Letters 37 (12) "Threshold and switching characteristics of a bistable nematic liquid-crystal storage display" by Julian Cheng et al.;

(10) Appl. Phys. Letters 36 (7) "Liquid-crystal orientational bistabillity and nematic storage effects" by G. D. Boyd et al.;

(11) J. Appl. Phys. 52 (4) "Boundary-layer model of field effects in a bistable liquid-crystal geometry" by J. Cheng et al.;

(12) J. Appl. Phys. 52 (4) "The propagation of disclinations in bistable switching" by J. Cheng et al.;

(13) J. Appl. Phys. 52 (2) "Surface pinning of disclinations and the stability of bistable nematic storage displays" by J. Cheng et al.;

(14) Appl. Phys. Letters 40 (12) "A nematic liquid crystal storage display based on bistable boundary layer configurations" by J. Cheng et al.;

(15) App. Phys. Letters 43 (4) "Discovery of DC switching of a bistable boundary layer liquid crystal display" by R. B. Meyer et al.;

(16) J. Appl. Phys. 56 (2) "Physical mechanisms of DC switching in a liquid-crystal bistable boundary layer display" by R. N. Thurston et al.;

(17) J. Appl. Phys. 53 (6) "Optical properties of a new bistable twisted nematic liquid crystal boundary layer display" by R. N. Thurston et al.;

(18) J. Appl. Phys. 52 (4) "New bistable liquid-crystal twist cell" by D. W. Berreman et al.;

(19) Appl. Phys. Letter 37 (1) "New bistable cholesteric liquid-crystal display" by D. W. Berreman et al.;

(20) Asia Display 95 "A bistable Twisted Nematic (BTN) LCD Driven by a Passive-Matrix Addressing" by T. Tanaka et al.;

(21) J. Appl. Phys. (59) (9) "Fast switching in a bistable 270° twist display" by H. A. Van Sprang.

SUMMARY

The abovementioned documents essentially concern studies relating to the breaking of bistable anchorings, to anchoring energies and to changes of state induced by the propagation of defects.

The object of the present invention is to improve liquid-crystal display devices in order to make it possible to obtain a novel bistable effect.

This object is achieved according to the present invention by virtue of a display device comprising two parallel transparent plates provided with transparent electrodes on their internal surfaces and containing a liquid-crystal material, characterized in that the device comprises:

means defining a monostable anchoring on each plate;

means capable of breaking, on command, at least one of these anchorings; and means capable of inducing, after this breaking, a bistable volume effect in the absence of an electric field.

These two volume textures, which maintain a stable state in the absence of an external electric field, must be compatible with the monostable anchorings on the plates.

According to one particular embodiment;

the plates define different anchoring thresholds (these anchorings may be, for example, planar or homeotropic);

the thickness of the device between the two plates is sufficiently small to allow hydrodynamic coupling between the internal surfaces of these plates; and means are provided which are capable of applying, between the electrodes of the two plates, alternately a write electric field pulse above a threshold capable of breaking the anchorings on the two plates in order to define, after interruption of this electric field, a twisted first stable state resulting from hydrodynamic coupling between the two plates, and a second electric field below the said threshold capable of breaking a single anchoring or having a falling edge which varies slowly in order to decouple the tilts on the two plates, so as to define a homogeneous second stable state.

BRIEF DESCRIPTION OF DRAWINGS

Other characteristics, objects and advantages of the present invention will appear on reading the detailed description which will follow, and with regard to the appended drawings given by way of non-limiting example, in which:

FIGS. 1a and 1b diagrammatically illustrate two nematic liquid-crystal textures obtained with planar anchorings;

FIG. 2 illustrates the forced alignment of liquid-crystal molecules with a positive dielectric anisotropy in an applied electric field;

FIG. 3 illustrates the curve relating the angle of the molecules at the surface of the electrodes with respect to a normal to the plates and the applied electric field;

FIG. 4 illustrates the curve relating the field threshold for breaking the anchorings to the duration of the applied field pulse;

FIGS. 5a, 5b, 5c and 5d diagrammatically illustrate four textures obtained in succession when the applied electric field is progressively decreased;

FIGS. 6a, 6b, 6c and 6d illustrate the textures obtained when, in contrast, the electric field is suddenly cut off;

FIG. 7 shows diagrammatically a mass current obtained close to a plate when the electric field is switched off;

FIG. 8 diagrammatically represents a localised flow shear adjacent to a plate and spreading out as far as the other plate upon cutting off the drive electric field;

FIG. 9 illustrates the effect of hydrodynamic coupling between the two plates;

FIG. 10 illustrates a bend structure obtained by virtue of the hydrodynamic coupling;

FIG. 11 illustrates a twist structure obtained after relaxation of the bend structure in FIG. 10;

FIG. 12 illustrates the tilt of molecules on a second plate due to the effect of hydrodynamic coupling;

FIGS. 13, 14 and 15 show diagrammatically the azimuthal orientation of the molecules and the azimuthal moment obtained due to the effect of the hydrodynamic coupling for various relative orientations between the easy anchoring directions;

FIG. 16 shows diagrammatically the structure obtained when a single anchoring is broken;

FIG. 17 shows diagrammatically two superposed plates possessing easy orientation directions rotated with respect to each other;

FIG. 18 diagrammatically illustrates a cell in accordance with the present invention;

FIG. 19 diagrammatically represents a matrix-configured screen in accordance with the present invention;

FIGS. 25, 26 and 27 diagrammatically illustrate three possible orientations of the nematic director, in the vicinity of a surface;

FIGS. 28, 29 and 30 diagrammatically illustrate three possible textures for homeotropic anchorings;

FIGS. 31 and 32 diagrammatically illustrate two possible textures for oblique anchorings;

FIG. 33 diagrammatically illustrates the switching caused by an oblique field applied by interdigitated electrodes;

FIG. 34 shows diagrammatically another alternative form of means making it possible to apply an oblique switching field, these being based on the resistance of the electrodes, and FIG. 35 represents the equivalent diagram of these electrodes;

FIG. 36 diagrammatically illustrates the switching caused by a hydrodynamic effect obtained by virtue of an auxiliary drive electrode;

FIG. 40 represents an example of a drive electric field for erasing this device;

FIG. 41 diagrammatically represents three stages of the same device, ending in erasure by virtue of the drive electric field illustrated in FIG. 40;

FIG. 42 represents another example of a drive electric field for erasure;

FIG. 46 represents the variation in the angle of the surface molecules as a function of the static drive electric field;

FIG. 47 represents the orientation of the surface molecules;

FIG. 48 represents five steps of the same oblique-anchoring slave-plate device, leading to erasure;

FIG. 49 represents the angle of the surface molecules as a function of the electric field;

FIG. 51 illustrates the optical behaviour of a device comprising a nematic/cholesteric mixture;

FIGS. 57, 58, 59 and 60 diagrammatically illustrate four drive signals for a device in accordance with the invention.

DETAILED DESCRIPTION

Figure 20:
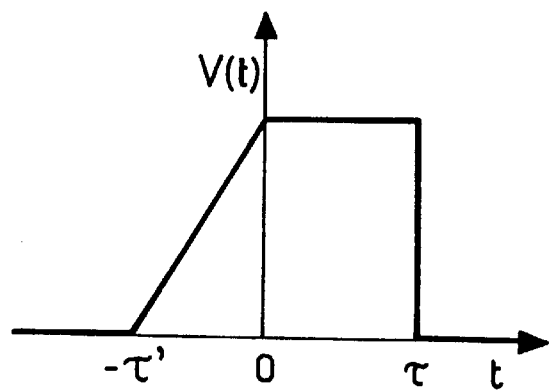
FIGS. 20, 21 and 22 diagrammatically represent three types of electrical drive signals.

A description will firstly be given of a preferred embodiment of the present invention exploiting hydrodynamic coupling, this embodiment being based on the studies and experiments which will now be explained.

Nematic liquid crystals may form various textures for identical anchoring conditions on the two transparent confinement plates 10, 12 of a display cell: for example, for readily produced anchorings called monostable "planar" anchorings, the two textures illustrated in FIGS. 1a and 1b may be obtained. In the texture illustrated in FIG. 1a, the liquid-crystal molecules 20 are all parallel to each other in the volume, and at the surface on the plates 10, 12. On the other hand, in the texture illustrated in FIG. 1b, the liquid-crystal molecules 20 exhibit a 180° twist structure, that is to say that the molecules, while still remaining parallel to the plates 10, 12, rotate progressively through 180° from one plate 10 to the other 12.

These two textures in FIGS. 1a and 1b have different optical properties and could, in theory, be used to define two states, white and black, for transmission of polarized light, by maintaining the surface anchoring conditions on the plates 10, 12. It is not possible to pass by continuous deformation from one texture to the other (they are "topologically" different); it is only possible to do so by creating defects which represent a high energy barrier compared to thermal agitation: even if the energy of the two textures a and b is very different, in the absence of defects these states may be regarded as being stable forever. The same is true if the defects become immobile, by adhering to the surfaces. The simplest way of providing bistability of the two different twist textures is well known to those skilled in the art: it consists in cholesterising the nematic liquid crystal with respect to a spontaneous twist intermediate between those of the two textures.

The multiplicity of textures corresponding to defined monostable anchorings is a general property of nematic or cholesteric liquid crystals. Those skilled in the art know how to choose, from these textures, two with similar energies but with different optical properties.

The present invention aims to cause transition between these two textures, in order to make it possible to produce stable pixels and therefore bistable liquid-crystal displays.

The description will remain for the moment with planar anchorings. It is known (see document [1]) that it is possible to "break" the surface anchorings by using an electric field E normal to the plates (see FIG. 2) and a nematic liquid crystal with positive dielectric anisotropy, $\epsilon_a = \epsilon_{//} = \epsilon_\perp > 0$, which forces alignment along the field. The critical field to break the anchoring is defined by the condition:

$\xi_E = 1$ where $\xi_E$ is given by $K/\xi_E^2 = (\epsilon_a/40\pi)E^2$, K is the elastic curvature constant ($\sim 10^{-6}$ cgs) and 1 is the extrapolation length defining the zenithal anchoring energy. This energy is written:

$W_s = (\frac{1}{2})(K/1)\cos^2 \theta_s$ where $\theta_s$ is the angle of the surface molecules.

In the case of "strong" anchorings (1~1000 Å), $E_s \sim 5$ V/$\mu$m and for "weak" anchorings (1~1 $\mu$m), $E_s \sim 0.5$ V/$\mu$m. For E increasing and approaching $E_s$, the surface angle $\theta_s$ goes rapidly from 90° to 0. Above $E_s$, the angle $\theta_s$ remains zero and the surface is said to be "broken". The curve relating $\theta_s$ to E is illustrated in FIG. 3. When the field E is applied in the form of a pulse of length $\tau$, the threshold increases when $\tau$ decreases (see document [3]), but since the surface dynamics are rapid it is possible to break the surface anchoring with voltages which remain moderate: for example, about 30 V, for times $\tau \sim 10 \mu$s, with the 5CB liquid crystal at room temperature ($\epsilon \sim 10$). The curve relating the threshold $E_s$ to the duration $\tau$ of the pulse is illustrated in FIG. 4.

When both surface anchorings are broken the texture of the cell is uniform (as illustrated in FIG. 2) and there is no memory of the initial state since the molecules 20 seen end-on cannot keep any twist.

The effect used within the context of the invention to initiate the textures is a dynamic effect. It relies on the following studies and observations.

Let us first assume that the two anchorings of the plates 10 and 12 have been broken, as explained above; if the electric field is decreased slowly, at every instant the system will choose its lowest-energy state in order to define a slowly varying texture.

Starting from the homeotropic orientation illustrated in FIG. 2, in an electric field, these textures will always go, in a zero field, towards the non-twisted state illustrated in FIG. 5d, with a planar orientation, passing through an intermediate situation illustrated in FIGS. 5b and 5c in which the molecules on the two surfaces of the plates 10, 12 rotate in the same direction, while remaining parallel. This arises from an elastic interaction between the plates 10, 12 which minmizes the curvature and the curvature energy of the system.

On the other hand, if the electric field is cut off suddenly, the effect obtained is very different, as illustrated in FIG. 6.

The dynamic effects are controlled by two characteristic times: the volume characteristic time $\tau_v$ and the surface characteristic time $\tau_s$. $\tau_v$ is universally given by the curvature elastically over the thickness d of the specimen as:

$1/\tau_v = K/d^2\eta$, where $\eta$ is a viscosity ($\eta = 0.1$ or 1 poise).

$\tau_s$ is given by the same formula, in which d is replaced by the surface extrapolation length 1, namely $1/\tau_s = K/1^2\eta$.

Since $1 \ll d$, $\tau_s$ is very much less than $\tau_v$; typically, for $d = 1\mu$ and $1 \sim 1000$ Å, $\tau_v = 1$ ms and $\tau_s = 10 \mu$s.

When the field E is released, the molecules on the two surfaces rotate rapidly during their times $\tau_s$, while the volume molecules remain virtually immobile. On this timescale, the elastic coupling between the plates 10 and 12 is negligible, but there is hydrodynamic coupling. Associated with the rotation of the molecules is a mass current (see document [22]). This current exists close to each plate, over a thickness of ~1. Its velocity V is approximately $V = 1/\tau_s$. Such a current is shown diagrammatically in FIG. 7.

Let us assume that the plate 12 has a threshold $E_{s12}$ greater than that $E_{s10}$ of the plate 10. In this case, the molecules 20 adjacent to the plate 12 tend to revert to the planar state before the molecules adjacent to the plate 10. Moreover, the return of the surface molecules adjacent to the plate 12 from the $\theta_s = 0$ orientation to the stable $\theta_s = 90°$ orientation (called the planar orientation) produces a localised flow shear V over 1, as shown diagrammatically in FIG. 8.

This shear diffuses over the thickness d of the cell in a time given classically by the relaxation of the vortices (Navier-Stokes equation in hydrodynamics) by:

$1/\tau_D = \eta/d^2\rho$, where $\rho$ is the density ($\rho \sim 1$).

If $\tau_D < \tau_s$, the information with regard to the tilting on the plate 12 reaches the plate 10 while it is tilting, and the two plates 10 and 12 are hydrodynamically coupled. This hydrodynamic effect is a transient one and only lasts for the tilt time $\tau_s$.

Over the diffusion time $\tau_D$, the velocity profile extends from the plate 12 towards the plate 10. The velocity amplitude becomes $v \sim V1/d$, since the movement of the slice 1 is distributed towards the slice d. A velocity gradient v/d appears on the plate 10, forcing the molecules on the plate 10 to tilt in the direction of v.

The hydrodynamic coupling between the surface tilts of the two plates 10, 12 may be quite strong (this will be explained later). In this case, the favoured tilt situation is still that in FIG. 9, in which the molecules on the two surfaces rotate in opposite directions, and in which the total hydrodynamic current v is uniform within the cell in order to minimize the friction. A 180° rotation between the orientations of the two plates 10, 12 is therefore always obtained. This rotation may be a bend, as illustrated in FIG. 10, which is generally unstable and is transformed into a 180° twist with a lower elastic energy, and therefore a twist texture as illustrated in FIG. 11.

If the hydrodynamic coupling is weak, one or the other of the textures a or b illustrated in FIG. 1 could be obtained but, because of the elastic interaction, the uniform texture is generally obtained.

The effect of the coupling force will now be explained.

Let us assume that the plate 12 has a higher threshold $E_s$ than the plate 10. If after having applied this field $E_s$ in order to break the anchorage the filed E is suddenly decreased to zero, the molecules on the plate 12 rotate rapidly over $\tau_s$ and create the shear v/d on the plate 10, with $\tau_D < \tau_s$.

For various reasons (elastic coupling, hysteresis, etc.), the molecules on the plate 10 may wish to drop from the $\theta_s=0$ direction to the planar stable $\theta_s=90°$ position while remaining parallel to the molecules which rotate on the plate 12 (in the $\omega_a$ direction) If this movement continues, it will give a uniform final texture. The velocity gradient shear v/d gives, within the volume, a moment density $\eta v/d$ to the molecules. The sum of these volume movements is a surface moment, $(\eta v/d)d \sim \eta v = \eta V 1/d$ which will rotate the surface molecules in the $\omega_H$ direction, as illustrated in FIG. 12.

In order to obtain the tilt which creates a twist structure as illustrated in FIG. 11, the surface moment thus obtained must therefore be greater than the anchoring moment which rotates in the $\omega_a$ direction (FIG. 12).

This condition is:

(K/1) $\theta_s < \eta V 1/d$. Replacing V by $1/\tau_s$, with $1/\tau_s = K/1^2 \eta$, gives $\theta_s < 1/d$.

$\theta_s$ is of the order of the variation in angle over the time $\tau_D$, and hence of the order of $\tau_D/\tau_s = (K\rho/\eta^2)(d^2/1^2)$. The condition becomes: $d/1 < (\eta^2/K\rho)^{1/3}$; with $\eta \sim 0.1$ poise, this gives d<201. If 1~1000 Å, d must be less than 2 μm. However, since d=2 μm is a typical thickness of the specimens, this condition is sometimes a little difficult to achieve. It would be necessary to use weak anchorings, with a longer response time.

Within the context of the invention, it will be considered that, preferably, the thickness d of the cell must be less than 5 μm.

Within the context of the invention, a method of hydrodynamically coupling the anchorings is therefore proposed which is more effective and which operates for strong anchorings.

Hitherto, only the $\theta_s$ zenithal anchoring, which is generally stronger, has been taken into account. However, there is also a preferred azimuthal direction on the plates which adopt "planar" orientations in a defined direction. Calling $\phi$ the azimuthal angle of the molecules with respect to this direction, the surface energy should be:

$W_s = \frac{1}{2}(K/1)\cos^2\theta_s + \frac{1}{2}(K/L)\sin^2\theta_s \sin^2\phi$ where L is the extrapolation length defining the azimuthal anchoring energy K/L.

In general, the azimuthal term has an amplitude an order of magnitude smaller than the zenithal term (see document [1]): L is an order of magnitude greater than 1. Looking at the lower plate 10 from above, it may be assumed that the surface molecules have been inclined by an angle $\theta_s$, after the time $\tau_D$, as illustrated in FIG. 13.

If the planar direction on the plate 10 is P, the molecules may assume the two possible states P1 and P2 on it. In order to force the molecules to drop down to the P2 state, which will give a half-turn, and not the P1 state, it is sufficient to move the end m of the molecule on the other side of yy', the mid-perpendicular of P1, P2 (FIG. 13). To do this, instead of changing $\theta_s$ by moving m along P1, P2, it is more effective to rotate m at constant $\theta_s$ around the circle C (FIG. 13). To do this, it suffices to rotate the easy anchoring direction of the upper plate 10 through an angle $\alpha$ with respect to P1 P2. The velocity v is in the direction $\alpha$ and produces a final alignment f. Since the moment exerted by the transient velocity gradient is now balanced by the single reaction of the azimuthal anchoring energy, the condition for the moments may be written here, for small $\theta_s$ as:

K/1 $\theta_s^2$ < K/d $\theta_s$.

The condition to be fulfilled is now: $\theta_s$ < L/d. Since L is an order of magnitude greater than 1, the coupling condition is easier to fulfil. Thus, finally: $d_\phi = d_\phi(L/1)^{1/3} > d_\phi$.

There exists an optimum rotation angle a of the two plates. If $\alpha$ is very small, a tilt very close to P2 (through 180°−α~180°) will occur, but it will be difficult to exert the initial azimuthal rotation moment: the system will prefer to change $\theta_s$ with less effectiveness, as illustrated in FIG. 14. On the other hand, if $\alpha$ is close to 90° the strongest possible azimuthal moment will be obtained, as illustrated in FIG. 15, but the rotation obtained will be only 90°, which is ineffective for providing the tilt since this rotation places the system just on the line of equal energy between P1 and P2. There exists an optimum value, which may be around 45°, or around 135°, if the anchorings have a polarity defined in the plane, as is the case for evaporated SiO or for a unidirectionally rubbed polymer.

In order to erase a "½-turn" twist, as shown diagrammatically in FIG. 1b, it is sufficient to "break" only a single surface anchoring, if carried out quickly, or to decrease the applied field slowly in order to decouple over time the two surface tilts, assumed to have different thresholds. In every case, surface treatments will be chosen which will give different anchoring thresholds on the two plates 10, 12.

The principle of effecting the ½-turn twist relies on the following phenomenon. When only one of the two surfaces is broken, as shown diagrammatically in FIG. 16, or when the two anchorings are released in succession at a time interval $>\tau_s$, there is no longer a hydrodynamic coupling effect: the elastic couplings dominate and the vertical orientation of one surface cannot maintain the twist, which disappears. The ½-turn twist is therefore erased.

On the basis of the above observations, the inventors propose to produce a display (in fact a pixel) with the aid of two plates 10, 12 treated in order to give planar anchorings A1 and A2 (or anchorings with a planar component) which are different. These anchorings coupled to a nematic with $\epsilon_a > 0$ have breaking thresholds E1 and E2 respectively. They are placed at $\alpha=45°$ to each other, as shown diagrammatically in FIG. 17, or at an angle $\alpha$ which is different 0°, 90°, 180 or 270° but which optimizes the rotational hydrodynamic coupling.

This angle $\alpha$ is also chosen to give good contrast between the initial texture, which is now twisted through the angle $\alpha$, and the so-called "½-turn" final texture, which is now twisted through an angle 180°−α. In order to write, an electric field pulse above the two thresholds, E>E1 and E>E2, is applied. By abruptly cutting off the field, the 180°−α state is still obtained, due to the effect of the hydrodynamic coupling, irrespective of the initial state, $\alpha$ or 180°−α. In order to erase, a pulse E between E1 and E2 is applied, rapidly cutting off the pulse, or a pulse which has a level above the two thresholds E1 and E2, but the amplitude of which is decreased slowly, is applied, in order to decouple the tilts on the two plates 10, 12; the $\alpha$ state is always obtained, whatever the initial state, $\alpha$ or 180°−α.

The supply means designed to apply such drive pulses are shown diagrammatically by the reference 40 in FIG. 18.

The optical contrast between the two states of such a pixel depends on the thickness of the specimen and on the orientation of the polarizers 30 and analysers 32 used (see FIG. 18).

The optimization problem is known to specialists (see document 23). In practical terms, for each liquid crystal and each cell, there is a position of the polarizers 30, 32 which gives an almost transparent pixel for one of the states and an almost black pixel for the other state.

The switching system described above has thresholds and an almost infinite memory. It is therefore, in principle, quasi-bistable and infinitely multiplexable. For the multiplexer, it is sufficient in a matrix-configured screen consisting of rows and columns, as shown diagrammatically in FIG. 19, to open one row by applying to it a voltage slightly less than $V=E_1 d$, the upper voltage threshold of the surface hardest to break. A voltage±v is applied to the columns. The resultant voltage will be $V-(\pm v)=V-v$ or $V+v$. $V-v$ is less than the higher threshold. If $|v|<(E_1-E_2)d$ is chosen, $V-v$ is greater than the small threshold and therefore "erases". $V+v$ is greater than the large threshold, and it "writes". It is advantageous to chose v as small as possible in order not to subject the other rows to an alternating voltage of amplitude (±v) which would create instabilities of another type, for example the Freedericks instabillity; v of about 1 volt, typically, for example, $v \leq 1$ volt, will be chosen in order to do this. The higher threshold will therefore have to be well-defined and uniform. The value of the lower threshold is less constricting. It cannot be too low in order for the system to remain rapid. In practical terms, anchorings will therefore be chosen which give threshold values in volts, in the region of about 1 volt. Since the typical thresholds are of the order of 10 V/$\mu$m (document 1), for a 2 $\mu$m thick cell, the thresholds must differ by from 5 to 10%.

In order to produce slightly different anchoring thresholds, and therefore breaking voltages, on the two plates 10, 12, it may be advantageous to use the same surface preparation technology (oblique SiO evaporation or surface-rubbed polymer, for example), but to vary the polarity of the thresholds. It is thus almost possible to cancel out or to amplify an existing small threshold difference. To do this, the flexoelectric effect or the ion transport effect may be used.

The two anchorings on the two plates 10, 12 play interchangeable roles in the proposed mechanism. Giving a difference in threshold between the two anchorings, which is related to the polarity of the applied field, is only meaningful if the cell is initially unsymmetrical, with two different threshold fields, E1 # E2, and therefore two different threshold voltages V1 and V2.

A first way of varying the thresholds is to use the flexoelectric effect which shifts the anchoring forces in proportion to the applied field (see document 24). This effect has a relative magnitude of $e/(K)^{1/2}$~a few $10^{-1}$, that is to say moderate or small.

A stronger polar effect may be obtained by ion doping. This is because it is observed that the anchoring energy depends on the polarity, as shown by the experiment below.

A 45° twist cell is taken, with two planar anchorings obtained by the same SiO evaporation. A cell thickness of 6 $\mu$m is chosen. The texture is a twist texture and polarized light follows this slow twist. Square electrical pulses, of length 100 ms and of defined polarity, are applied. The amplitude of the pulses varies from 0 to ±40 V. The long time is chosen in order to be sure of transferring all the ions in the cell from one plate to the other. The cell contains pentylcyanobiphenyl (5CB) at room temperature, doped with $10^{-3}$ mol of sodium tetraphenylborate which gives two ions, namely $Na^+$ and $T\Phi B^-$.

During the application of the field, the orientation of the individual axes and the birefringence of the cell in polarized light are observed. It is thus possible to determine which plate has broken—the individual axes align up with the direction of the other plate—and at which values of the field the two anchorings break. The results show that the surface which attracts $Na^+$ ions breaks first, at V=3 V, that is to say at 0.5 V/$\mu$m, an order of magnitude lower than is usual. The other plate breaks at V=30 V, that is to say for a field value of 5 V/$\mu$m (about normal).

The experiment is repeated with another icon. The nematic is now doped with tetrabutylammonium chloride which gives two ions, $Cl^-$ and $TBA^+$. It is observed that the $Cl^-$—attracting surface sees its threshold decrease to 1.5 V/$\mu$m. If the nematic is doped with cetyltirbutylammonium bromide, which gives $Br^-$ and $CTBA^+$ sions, the anchoring energy on the surface attracting the $CTBA^+$ ion is observed to decrease to 1 V/$\mu$m.

The effect of the first two dopings may be understood from the greater affinity of the small inorganic ions for the SiO surface. These ions create an electric field normal to the surface, which decreases the anchoring force as it an external field had been applied. The third doping is explained by the action of the 16-carbon cetyl chains. When the charged end of a chain adheres to the surface, the chain induces a perpendicular orientation, which decreases the planar anchoring force.

Those skilled in the art will understand that bringing the thresholds E1, E2 closer together favours the writing procedure while moving the thresholds E1 and E2 further apart favours the erasure procedure.

Illustrative Embodiment

The inventors have produced a display with the pentylcyanobiphenyl (5CB) nematic liquid crystal which has a nematic phase at room temperature and a high dielectric anisotropy $\epsilon_a$~10>0.

The display comprises glass plates 10, 12 treated with ITO (Indium Tin Oxide) which gives transparent electrodes with a low resistance (30 $\Omega$/square). These are treated by oblique SiO evaporation with an almost grazing evaporation angle of 75°, and thicknesses of 25 Å and 30 Å these being known to give a planar anchoring with slightly different anchoring force (document 25). The cell has a thickness of d=1.5 $\mu$m, with a rotation of $\alpha$=45°. The geometry of the orientations of the cell is shown in FIG. 18.

This cell makes it possible to obtain, for the 45° texture, a bright yellow colour with a high transmitted intensity. For the 180°−$\alpha$=135° state, a low transmitted intensity, with a very dark blue, almost black, colour has been obtained.

In order to test the model, the inventors applied square pulses, of a fixed length of 300 $\mu$s and of amplitude V varying from 0 to 40 volts, to the system. The fall time was less than 1 $\mu$s. Bright-to-dark (white to black) switching was obtained at V=24.5 volts. Starting from a black state, the inventors always obtained a black state with these same pulses. Next, the inventors applied a pulse of the same polarity to this black state, but with an amplitude of 21.5 volts. A black-to-white transition, corresponding to erasure, was obtained. These same 21.5 volt pulses leave an initial white state unchanged. The final state of the system therefore depends, for the same polarity, only on the amplitude of V. This behaviour is explained by the inventors by the fact that one of the thresholds is slightly less than 24.5 V and the other less than 21.5V.

In order to confirm that the behaviour of the system is controlled by just the final decrease of the drive signal, the inventors performed the following experiments.

In the first place, the inventors used pulses whose front edge is linear in time, as illustrated in FIG. 20.

More specifically, the inventors chose a plateau time $\tau=100$ $\mu s$ and varied the rise time of the front edge $\tau'$ from 0 to 300 $\mu s$. With $\tau'=0$, the system undergoes the white-to-black transition at V=25 volts (or black to black if the initial state is black). Over the entire range of $\tau$ used, the behaviour does not change, the threshold remaining at 25 volts ±0.5 volts. This shows that only the amplitude and the fall of the pulse are effective.

Figure 21:
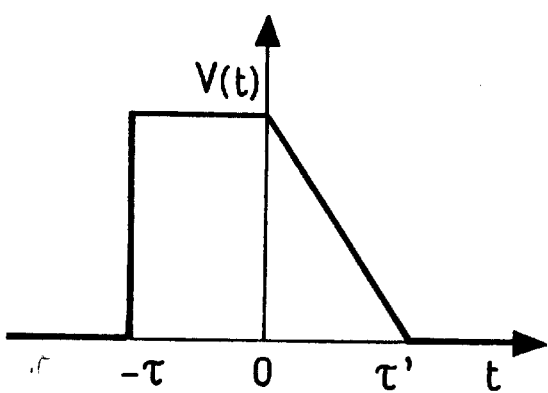

In the second place, the inventors used pulses whose falling edge is linear in time, as illustrated in FIG. 21. For fall times of $0<\tau'<30$ $\mu s$, the behaviour remains unchanged. Beyond this, for $30<\tau'<300$ $\mu s$, a black-to-white erasure is obtained on starting from black, and white goes to white on starting from white. For $\tau=100$ $\mu s$ and $\tau'=0$, a threshold V=25 volts is found. This behaviour confirms that only the slow falling edge of the pulse is effective for erasure. By falling linearly, the triggering of the two thresholds is shifted in time. With the 21 volt and 25 volt values, the shift in time is $[(25-21)/25]\times30$ $\mu s\sim 5$ $\mu s$.

This value is the estimated value of the surface tilt time.

Figure 22:
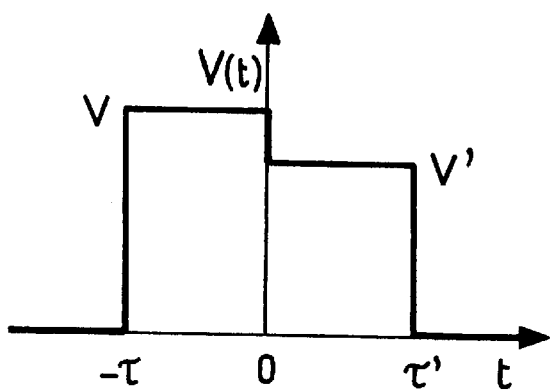

In order to really isolate the two thresholds in the same experiment, the inventors next used a pulse having a double-square shape of amplitudes V and V' and of durations $\tau$ and $\tau'$, as illustrated in FIG. 22.

The inventors chose $\tau=1$ ms in order to be sure that the system switches only on the falling edge, without any memory of a prior effect. With V'=0, a white-to-black or black-to-black switch was obtained at V=22 volts.

Next, the inventors chose V=30 volts, in order to be well above the threshold and, by taking $\tau'=0.5$ ms, they varied V'. For 30 volts>V'>20 volts, the black writing was preserved. On the other hand, for 20 volts>V'<7 volts, the system becomes a binary counter, that is to say that it produces white-to-black or black-to-white switch-overs. For V' between zero and 7 volts, the black writing is again well-defined.

The inventors next changed the polarity of V', keeping that of V. The same behaviour was observed:

−30 volts<V'<−20 volts: writing in black

−20 volts<V'<−7 volts: "counter" regime

−7 volts<V'<0 volts: writing in black.

As it stands from their work, the inventors explain the counter regime as an incomplete erasure—the system remembers the initial state.

The important result from this experiment is that, for V'=−V, writing is obtained; this is also confirmed for $\tau'=\tau=1$ ms. The inventors have therefore shown that AC driving is possible.

Figure 23:
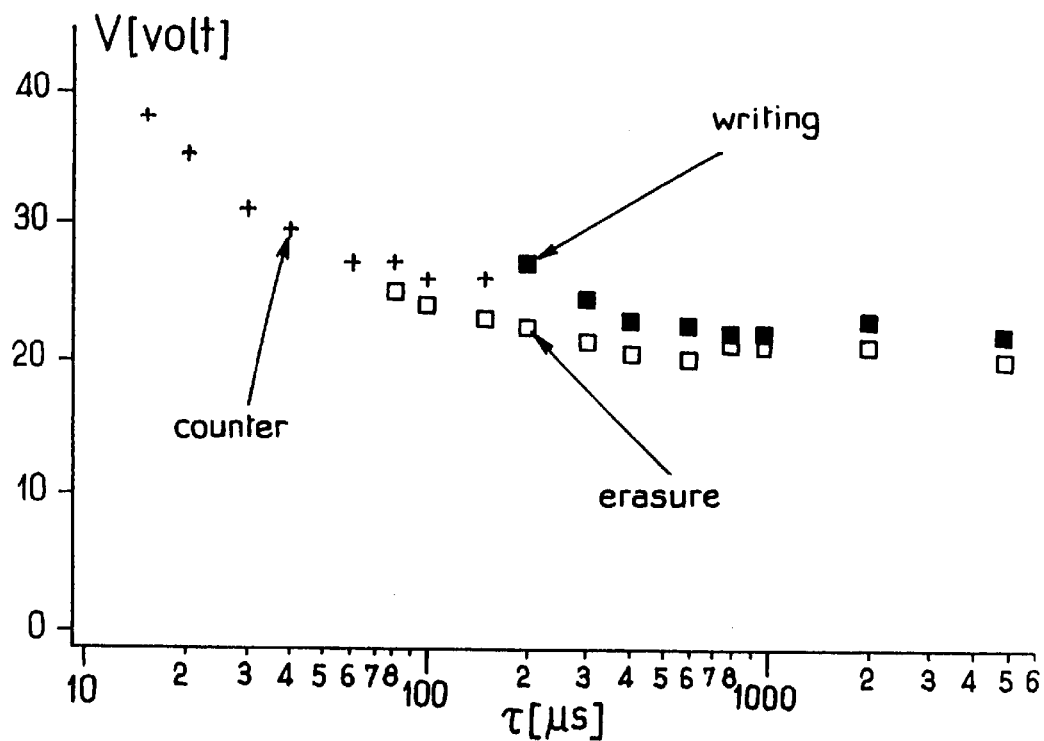
FIGS. 23 and 24 represent curves of switching voltage versus duration of the electric field, respectively for pure 5CB and for doped 5CB.

The inventors measured $V(\tau)$ for the above specimen. On 5CB for curve of V, they observed writing ($\tau$) as illustrated in FIG. 23. This writing/erasure behaviour at a fixed polarity is satisfactory down to $\tau=150$ $\mu s$. For shorter times, a "counter" regime is observed.

Figure 24:
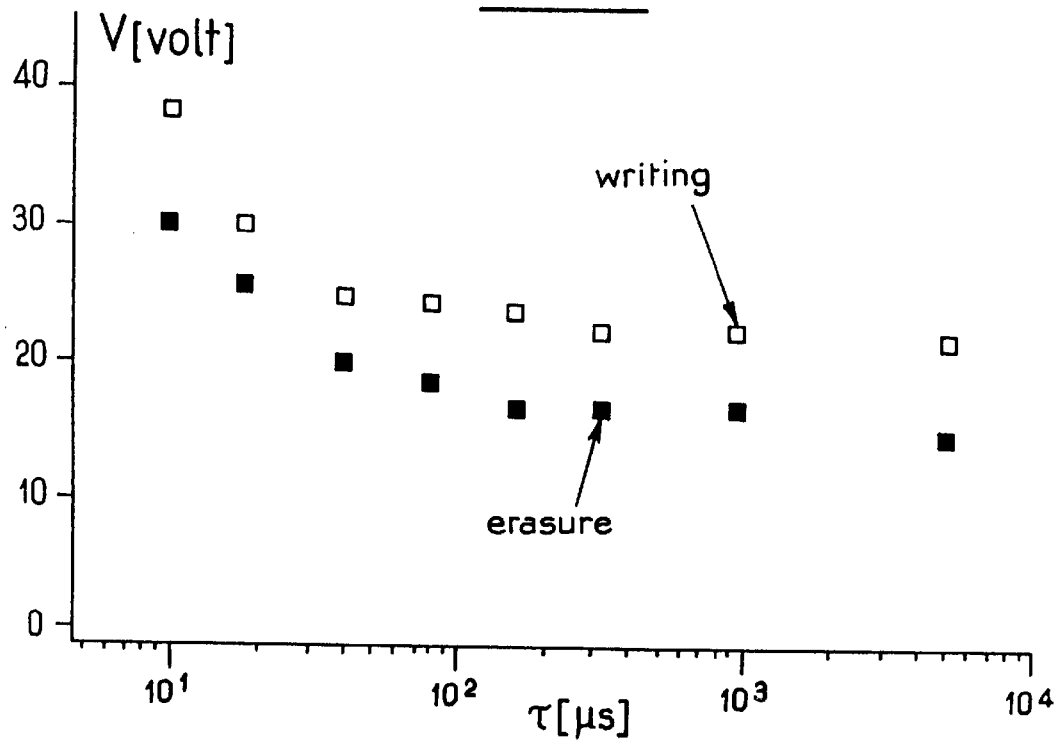

In order to improve this behaviour, the inventors then used a 5CB liquid crystal doped with $10^{-3}$ mol of $Na^+$ $T\Phi B^-$, with a thickness of 1.5 $\mu m$. They used positive pulses for writing and negative pulses for erasure. In this case, they obtained a controlled writing and erasure regime down to 10 $\mu s$, at voltages of 30 and 38 volts as illustrated in FIG. 24. At 30 $\mu s$, erasure and writing were obtained for 22 and 26 volts.

In white light, the inventors obtained a contrast of 20 between the two states.

Of course, the present invention is not limited to the particular embodiment which has just been described, but extends to any alternative form in accordance with its spirit.

In particular, the present invention is not limited to the use of nematic liquid crystals. It also extends to the use of liquid crystals of the cholesteric type.

Furthermore, the switching by hydrodynamic coupling is not limited to the use of planar anchorings on the plates. It may extend to homeotropic or even oblique anchorings.

Moreover, in a more general way, as explained above, the invention is not limited to the use of switching by hydrodynamic coupling but extends to any monostable-anchoring device, comprising means capable of causing a break in at least one of the anchorings and in subsequently inducing a bistable volume effect.

Furthermore, the invention applies to a large number of possible textures.

It is known that the treatments applied to each of the plates 10, 12 of a liquid-crystal cell may be designed to impose a planar anchoring direction (nematic director parallel to the plates, see FIG. 25), a homeotropic anchoring direction (nematic director perpendicular to the plates, see FIG. 26) or an inclined anchoring direction (nematic director which is oblique with respect to the plates, see FIG. 27).

With both these plates arbitrary, it is possible to define several textures with a single anchoring direction of the molecules on each plate.

For example, for two planar anchorings it is possible to produce a uniform planar texture, as illustrated in FIG. 1a, or structures twisted to the left or to the right with a half-turn, as illustrated in FIG. 1b, or indeed with several half-turns, the nematic director in this case remaining parallel to the plates but rotating progressively around an axis perpendicular to them, or else bend structures, as shown diagrammatically in FIG. 10, for which the nematic director does not remain parallel to the plates but is progressively inclined with respect to them.

For two homeotropic anchorings, it is possible to obtain a homeotropic uniform texture (FIG. 28) or bend textures with one (FIG. 29) or more half-turns. These bend textures may, in addition, be twisted (FIG. 30).

In general with two monostable surface anchorings in two arbitrary directions, it is possible to obtain different textures: a simple texture which connects, directly by a simple twist and a simple bend, the two arbitrary anchoring directions, as illustrated in FIG. 31, and textures which differ from this simple texture by adding one or more half-turns on going from one surface to the other, as shown diagrammatically in FIG. 32.

The nematic director has been shown diagrammatically in the appended FIGS. 28 to 32 as an arrow.

By comparing FIGS. 28 and 29 or 30, 31 and 32, it may be seen that the corresponding arrows on the two plates are in opposite directions. Physically, since the interaction of the nematic liquid crystal with the surface is not polar, the opposite directions of the two arrows are equivalents with respect to the surface. However, these arrows enable the differences in volume textures, rotated for example through a half-turn between FIGS. 28 and 29, or 30, 31 and 32, to be clearly visualized. The same applies to FIGS. 1a and 1b.

Moreover, these various textures, corresponding to the same anchoring direction, possess different optical properties, which allow them to be optically distinguished and to be used as one of the two states of a black-and-white display pixel.

As indicated previously, the switching between the various textures takes place, having broken the surface anchoring.

FIG. 3 illustrates the variation in the angle θ of a surface molecule with planar anchoring as a function of an applied electric field E.

Above $E_s$, the surface molecules are in a situation in which the elastic energy of the interaction with the surface is maximum. If the field E is cut off, the surface molecules drop back into the initial planar orientation, but they may choose two different paths. In FIG. 3, these two paths correspond to the bifurcation below $E_s$ between positive and negative angles. The two final states, θ=±90°, are identical for the surface, as explained above. However, they give different volume textures: the additional 180° rotation corresponds to a texture which is twisted through a half-turn with respect to the initial texture. If the distortion remains in the plane of the figure, a 180° bend texture is obtained (FIG. 10). In general, since twisting is easier than bending, the 180° bend is transformed continuously into a 180° twist in FIG. 1b.

The function of the switching means capable of inducing a bistable effect, after breaking the anchoring, is to control the bifurcation of the orientation $E_s$ so as to obtain, as required, one or the other of the two corresponding bistable textures.

More generally, for any bistable texture mentioned above, obtained by varying the angles, elastic constants and the twisting power corresponding to the same anchoring on one plate and to two anchorings differing by a half-turn on the other plate, there exists a dividing line, similar to the bifurcation already described, for the surface energy on the second plate.

The purpose of the anchoring breaking is to bring the surface molecules into the vicinity of this dividing line by means of a strong electric field.

In addition, the function of the switching means, through a small external effect, is to control the movement of the system on either side of the dividing line. The two resulting directions are equivalent for the surface but lead to one or the other of the two bistable textures.

In order to break the surfaces, the appropriate means will be chosen: if the field is perpendicular to the plates, it is necessary, in order to break a planar anchoring, for the liquid crystal to have positive dielectric anisotropy so that the molecules are aligned parallel to the field; in order to break a homeotropic anchoring, it is necessary for the material to have negative dielectric anisotropy.

It will be noted that an important and general property of surface breaking is their rapidity: the corresponding relaxation times are in the microsecond range. They are independent of the thickness of the nematic cells.

Various means will now be described which make it possible to switch between the various possible textures, that is to say making it possible to control the bifurcation of the orientation at $E_s$.

Let us assume that a planar anchoring has been broken above its bifurcation point. The surface molecules are perpendicular to the plates. When the field is cut off, the molecules drop back down to one or the other of the two equilibrium states, +90° and −90°. The function of the switching means is to control the final direction of orientation between these two states. The purpose of these means is to apply a small moment to the molecules in order to make them tilt to one side or to the other. This moment may be applied either at the same time as the breaking field or just afterwards, but it must act for as long as the molecules remain close to the dividing line.

A first way of generating such a moment consists in applying a lateral electric field to the cell.

Such a lateral field may itself be obtained in several ways.

According to a first variant, the lateral field may be applied with the aid of interdigitated electrodes 50, 52 on one of the plates 10, facing the plate 12 whose anchoring is broken as shown diagrammatically in FIG. 33. The mean field remains applied between the two plates 10, 12 at the top and bottom. The lateral field gives a small oblique component to the resultant field. Depending on its sign, the oblique fields $E_1$ or $E_2$ are obtained.

The application of $E_1$ or $E_2$, which are shifted through a small angle about the normal, makes it possible to control drop-down onto the planar states 1 or 2, which are identical for the surface but different for the texture.

According to a second variant, the lateral field may be applied by means of electrodes provided along the edge of the cell.

According to a third variant, the lateral field may result from the resistance of the transparent electrodes provided on the plates 10, 12. As illustrated in 34, one of the electrodes 60 in this case possesses at least one edge 62, preferably two edges 62, which are more conducting than its central part 64. The electrical signal V necessary to break the anchoring is transmitted along the RC circuit formed by the surface resistance R and the capacitance C of the liquid crystal (see FIGS. 34 and 35). At high frequencies, a signal is rapidly attenuated and the pixel appears as an electrode edge, giving an oblique field. At low frequencies there is no attenuation and the field is vertical. This mechanism is described in document FR-A-86 06916. A field inclined in both directions is obtained by using double-lateral-control pixels: the signal $V_1$ or $V_2$ is applied to one or the other of the conducting edges of the semi-transparent electrode of he pixel. $V_1$ gives the right orientation and $V_2$ the left orientation.

A second way of generating the aforementioned orienting moment consists in exploiting a hydrodynamic effect.

In this case, at the time of returning to equilibrium, a small shear v is generated between the plate with broken anchoring and the nematic.

This may be achieved by a mechanical displacement of all or part of the plate, due to the effect of a piezoelectric system for example, or else due to the effect of sound waves.

The nematic is sensitive to the velocity gradient close to the plate and drops, depending on the direction of v ($v_1$ or $v_2$), on one side or on the other side of the bifurcation.

The shear v may also be produced by a flow between the two plates, this being produced by any source whatsoever, for example by simply pressing on the screen perpendicular to the plates.

The system then constitutes a pressure detector. It may be used to write on a screen, by converting the pressure into an electrical property associated with one of the two bistable textures.

Another variant consists in exploiting the shear current caused by the tilting of certain molecules. This effect is the reverse of the previous effect, in which a shear controls a tilt.

To do this, it is possible to use, for example, a linear drive electrode c alongside a square pixel (FIG. 36).

At c the anchoring is, for example, oblique while at P it is planar.

Due to the effect of a field applied to the pixel, the anchoring P is broken.

If a drive field E' is applied to the lateral electrode, at the time when the field E is cut off, the flow v' associated with the reorientation of c due to the effect of E' switches the orientation of the pixel P into state 1.

If on the other hand the field E' is applied at the same time as E and if it is also cut off at the same time, the flow caused by E' is in the opposite direction, −v', and the pixel switches into state 2.

Another variant which exploits hydrodynamic coupling and consists in breaking two face-to-face anchorings has been described previously.

Of course, the invention is not limited to the bifurcation control examples described previously in the case of planar geometry which, after breaking, become homeotropic.

Indeed, as mentioned, the invention also applies to controlling the bifurcations in geometries which are homeotropic or inclined in the off state.

Furthermore, the tilting may be performed in two dimensions, by involving not only the zenithal surface angle θ, but also the azimuthal angle θ as described previously in the case of hydrodynamic coupling. Rotation of θ equal to −90° to +90° may also be interpreted as a simple 180° rotation of φ. This is important for the couplings with the lateral electric fields or the lateral hydrodynamic flows, which have a well-defined azimuthal direction.

It will furthermore be noted that the switching may be performed over the entire surface of a pixel at the same time, in order to form a black-and-white display, or over a variable part of this pixel, in order to form a grey-tone display.

Driving only a variable part of a pixel may be achieved either by a non-uniform breaking field on the latter or by non-uniform means for controlling the bifurcation.

Finally, it will be noted that, in some configurations, the anchoring breaking means and the means capable of inducing a bistabel volume effect, which were described previously, may be used with multistable, for example bistable, anchorings and not just monostable anchorings.

Up to now, it has essentially been demonstrated in the preceding description that the breaking of a planar anchoring makes it possible to control a transition between two bistable volume textures. This is, in this case, complete breaking—in an elecric field the molecules on the surface orient precisely along the field, passing through the point of bifurcation. The breaking of oblique anchorings, also mentioned in the preceding description, is different. This is a partial breaking: the molecules move towards the direction of the field, without ever reaching it and without passing through the point of bifurcation.

Within the scope of the invention, the use of this partial breaking of the oblique anchorings will now be explained in detail.

The oblique anchoring plate may fulfil two different roles:

1) Either an emitter role ("master plate")—in this case the oblique anchoring plate serves to drive the other plate. The master plate never passes through its point of bifurcation and, at field cut-off, it always reverts to its orientation, emitting a very strong and rapid shear current;

2) Or a receiver role ("slave plate")—in this case the electric field partially breaks the oblique anchoring on the plate, but not as far as bringing it to its point of bifurcation. Nevertheless, it does come quite close to the point of bifurcation, in order to be able to go beyond it due to the hydrodynamic or elastic effect induced by the master plate.

We will first of all tackle the case of an oblique anchoring master plate.

In order to make the hydrodynamic effect more effective, it is posible to use as rapid shear source an oblique anchoring plate 10. This plate 10 will therefore drive, by hydrodynamic coupling, the other plate 12 which will be chosen, for example, to have a planar anchoring (FIG. 37).

Figures 37A, 37B, 37C, 37D:
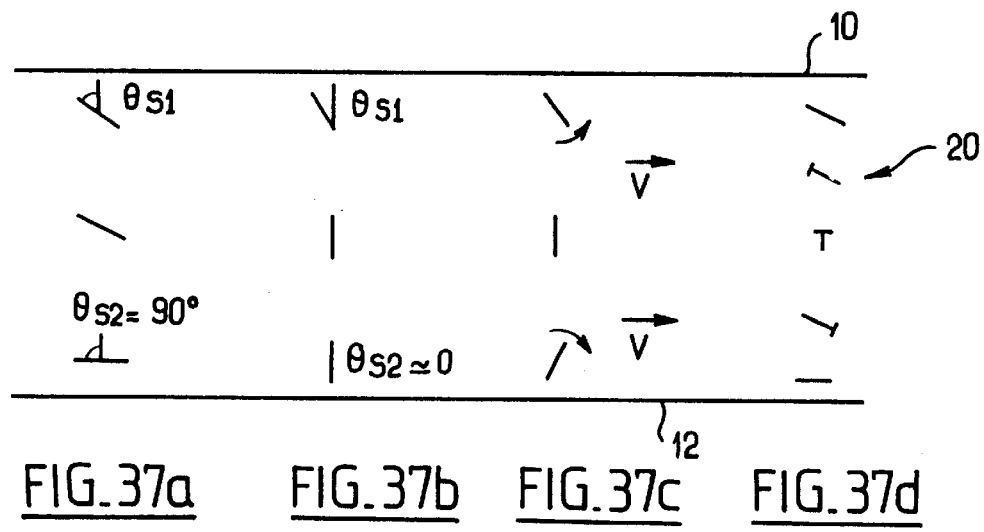
FIG. 37 diagrammatically represents four stages of a device in accordance with the invention, comprising an oblique anchoring master plate.
Figure 38:
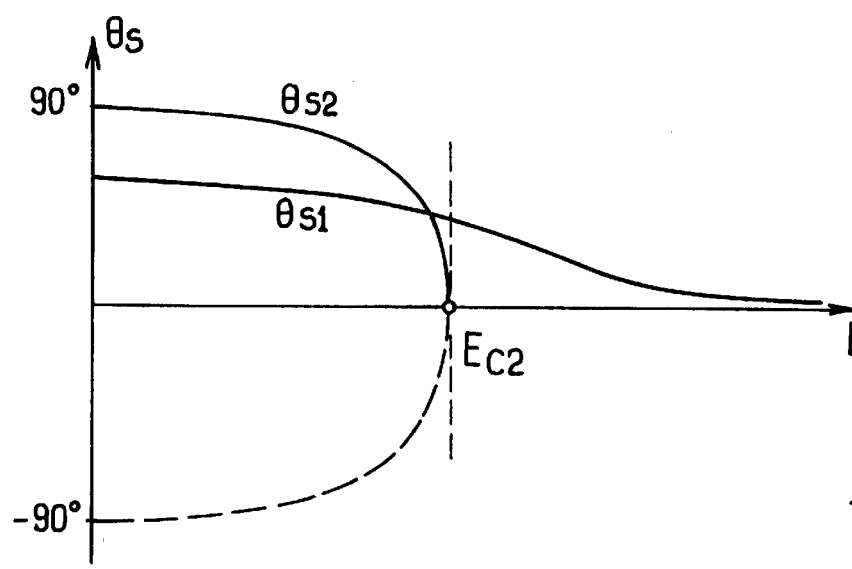
FIG. 38 diagrammatically illustrates the angle of the surface molecules as a function of the static drive electric field.

Let us assume that, before applying the breaking electric field, the texture of the cell is a twist-free texture with a slight splay twist because of the asymmetrical anchorings (FIG. 37a). In a breaking electric field, for example perpendicular to the plates, the molecules orient so as to be almost parallel to the field, pulling on the two surfaces. Above the threshold $E_{c2}$ (FIG. 37b), the planar surface 12 breaks and $\theta_{s2}=0$ is obtained. The molecules on the oblique surface 10 always remain at a small angle $\theta_{s1}$ with respect to the field: for an oblique plate, surface breaking threshold does not exist and the plate does not pass through the point of bifurcation (FIG. 38).

Figure 39:
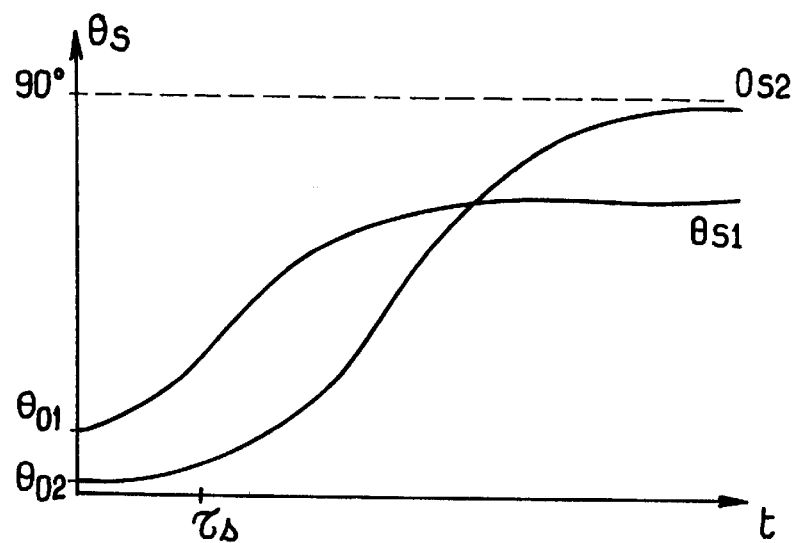
FIG. 39 illustrates the same angle as a function of time, after stopping of the drive field in the absence of coupling between the two surfaces.

When the field is abruptly cut off at $E>E_{c2}$, the oblique plate 10, which is now in non-equilibrium, rapidly tilts back to its initial orientation (see FIG. 39). The angle $\theta_{s1}$ increases exponentially as $\theta_{s1} \cong \theta_{01} \exp(t/\tau_s)$, from the high initial value $\theta_{01}$, and afterwards saturates to the value imposed by the oblique anchoring. On the other hand, the planar plate 12 is in unstable equilibrium at t=0 and tilts slowly: $\theta_{02}$ also increases exponentially, but from a very low angle $\theta_{02}$, which is determined by fluctuations.

The shear produced by each of the plates 10, 12 is proportional to the derivative of the angle with respect to time. It is much greater for the oblique plate 10 (of the order of $\theta_{01}/\tau_s << \theta_{02}/t_s$). The latter plate thus becomes a master plate: its shear current after diffusion through the specimen 20 drives the planar slave plate 12 beyond the point of bifurcation (FIG. 37c). A bend half-turn is therefore produced in the specimen 20, which transforms into a twist half-turn (FIG. 37d).

Alternatively, in order to erase the half-turn, it is necessary to prevent the hydrodynamic coupling between the two plates 10, 12. One way of doing this is to decrease the voltage across the threshold $U_{c2}$ gradually, as illustrated in FIG. 40.

During the first part of the pulse (i.e. from t=0 to $\tau_1$), the anchoring on the planar plate 12 is broken and irrespective of the initial texture the almost homeotropic texture in FIG. 37b or 41a is obtained. The slow fall ($\tau<<\tau_s$) through the threshold renders the hydrodynamic effect induced by the master plate 10 barely effective. The slave plate 12 is now driven by the weak elastic static coupling (FIG. 41b), which always favours the uniform final texture (FIG. 41c).

Figures 43A, 43B, 43C, 43D:
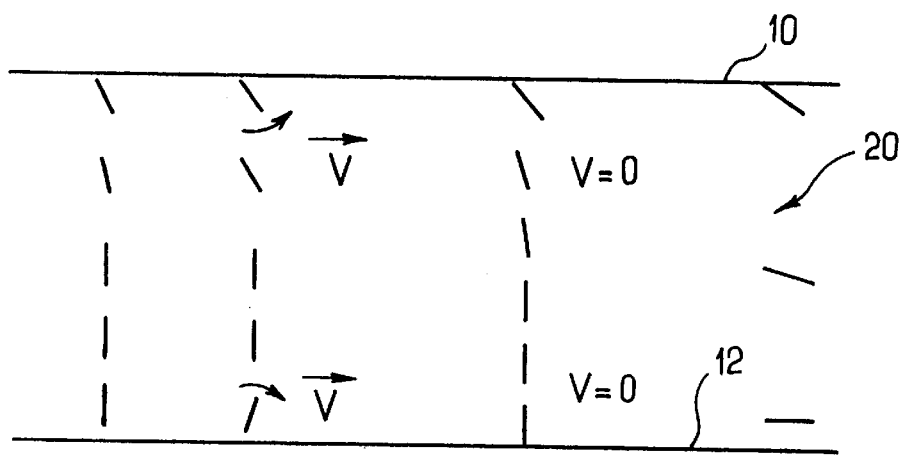
FIG. 43 represents four stages of the same device, leading to erasure by virtue of the drive electric field illustrated in FIG. 42.

Another way of achieving the same effect—that is to say of erasing the previously obtained half-turn in the specimen 20—is to use a two-step rectangular electrical signal (FIG. 42). Once again, the initial texture is erased during the first part of the pulse (FIG. 43a) (from 0 to $\tau_1$ in FIG. 42). At t=$\tau_1$, the voltage abruptly falls to $U_2$ slightly above the threshold $U_{c2}$. The master plate 10 produces a strong transient hydrodynamic current (FIG. 43b), which gradually disappears. The anchoring remains perpendicular in the broken position. The elastic effect, which in this geometry is permanent, overcomes it and at the end of the pulse the slave plate 12 has already chosen an orientation (FIG. 43c) which relaxes without a field to the uniform texture. The abrupt cut-off of the field at t=$\tau_1+\tau_2$ always creates a small hydrodynamic effect, but if the anchoring on the planar plate 12 is quite weak ($U_{c2}<U_{c1}$) the hydrodynamic coupling is too weak to resist the elastic static effect. The final texture will once again be uniform (FIG. 43d).

In order to test the effectiveness of the writing and erasure which are induced by an oblique master plate 10, the inventors prepared thin cells (thickness d=1.5 μm). On the master plate 10, they chose an oblique strong anchoring ($\theta_{s1} \cong 55°$), produced by grazing evaporation of SiO on the plate 10. A weaker planar anchoring was produced on the slave plate 12 by evaporating SiO under suitable conditions. The planar components of the two anchorings were chosen to be parallel to each other, however, this arrangement is not mandatory. Two textures are produced spontaneously when filling the specimen with the nematic liquid crystal 5CB—the uniform texture (FIG. 37a) and the half-turn twist texture (FIG. 37d). The twist texture has a higher energy and in a few seconds it is erased by movement of the defects. Thus any specimen becomes uniform spontaneously.

Figure 44:
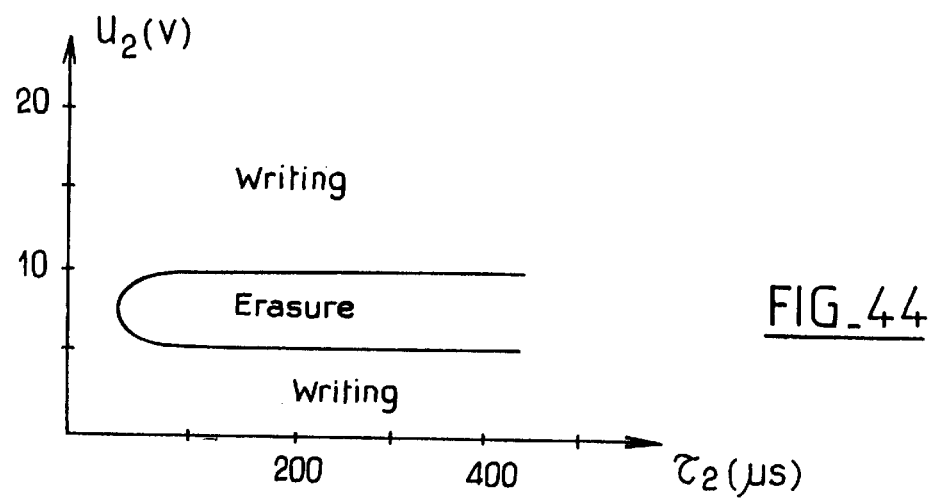
FIG. 44 represents a diagram of the voltage $U_2$ as a function of time $\tau_2$ and illustrates writing/erasure states as a consequence.

A rectangular pulse of voltage U and duration, τ is now applied between the plates 10, 12. Up to $U=U_{c2}(\tau)$, the breaking threshold for the planar anchoring of the plate 12, only transient nictitation is observed, with no change in the texture. On the other hand, at $U \geq U_{c2}$ (in this case, the dynamic anchoring breaking threshold $U_{c2}$, equal to 20.8 V for τ=100 μs), half-turns are written over the entire surface of the cell. If the same pulse is applied to the twist texture, the final state always remains twisted. A rectangular pulse can therefore be used to write the half-turns. For erasure, the pulse in FIG. 42 is applied, in which $U_1$=24 V and τ=100 μs, and $U_2$, $T_2$ varying if $T_2$<50 μs, erasure never occurs and the half-turn is written, as with the rectangular pulse. If $τ_2$ is extended, a range of voltages always exists for $U_2$ in which the half-turn is erased (FIG. 44).

Another specimen of the same type was used to attempt erasure with a gradual fall in the voltage, as illustrated in FIG. 40. With a fall time $τ_2$ shorter than 30 μs, the inventors have observed writing of half-turns. Lengthening $τ_2$ without changing the voltage U, they always obtained a uniform final texture.

These observations confirm the model explained above and show that the use of an oblique anchoring master plate 10 is a highly effective means for writing and erasing the half-turns. Similar results were also obtained with cells having a pretwist between 0° and 90°, these being obtained by rotating one of the plates with respect to the other (as already explained, this geometry facilitates the hydrodynamic coupling).

We will now tackle the case of an oblique anchoring slave plate.

To understand the utility of an oblique anchoring slave plate 12, we will analyse the anchoring breaking in a cell in which the molecules on both plates 10, 12 have oblique anchoring (FIG. 45): the angle of inclination θ is greater on the master plate 10 and much smaller on the slave plate 12.

Figures 45A, 45B, 45C, 45D, 45E:
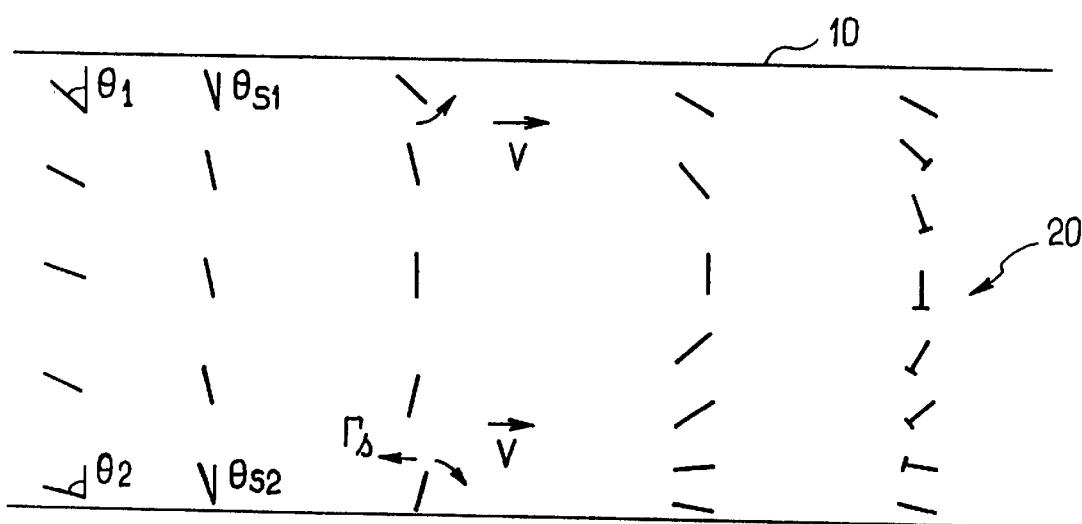
FIG. 45 represents five steps of a device in accordance with the invention, comprising an oblique anchoring slave plate and leading to writing.

We start with the "uniform" (twist-free) texture in FIG. 45a. In an electric field perpendicular to the plates 10, 12, the molecules on the two surfaces 10, 12 move towards the vertical, without ever reaching it (FIGS. 45b and 46): for both surfaces, the point of bifurcation is on the other side of the vertical (FIG. 47). In FIG. 47, $Γ_h$ depicts the hydrodynamic moment, $Γ_s$ the elastic moment and m the direction of the anchoring energy maximum (bifurcation).

Let us now assume that the field is strong enough to orient the molecules on both surfaces 10, 12 (FIG. 45b) so as to be almost vertical ($θ_{s1}$≅0, $θ_{s2}$≅0). When the field is cut off, a large elastic surface moment $Γ_s$≅(K/$l_1$) $α_1$ acts on the master plate 10. $1_1$ represents the anchoring force on the plate 10. The molecules on this plate 10 tilt towards their initial position, emitting a high shear current. The hydrodynamic moment $Γ_h$ transmitted to the slave plate 12 is of the order of K/d and it tries to tilt the molecules through the vertical (FIG. 45c). An elastic surface moment $Γ_s$, of the order of $K_{α2}/1_2$, oppose this. $1_2$ represents the anchoring force on the plate 12. The condition for writing half-turns in this geometry is therefore obtained: K/d>K$α2$/$1_2$, or $α_2$<$1_2$/d, that is to say that the oblique slave plate 12 can be driven effectively if its anchoring is weak and its field-free inclination $θ_2$ is very close to 90° (almost planar). If this is the case, the bend half-turn in FIG. 45d and, finally, the twist half-turn in FIG. in FIG. 45e are obtained.

For erasure, an electric field is once again applied to the twist half-turn texture (FIG. 48a). In a field, it transforms to a bend half-turn (FIG. 48b), which allows the molecules to orient along the field almost throughout the specimen. However, close to the slave plate 12, a thin region of almost planar orientation remains. This region is topologically blocked in the texture: its existence depends on the relative orientation of the two anchorings and on the initial volume texture. A high (elastic and electric) energy is stored in the planar region and the resultant moment pulls on the molecules at the surface towards the plate 12 and no longer towards the vertical: in this way, the planar region is "expelled" from the specimen and the energy decreases (FIGS. 48b and 48c).

The behaviour of the surface angle $θ_{s2}$ as a function of the field is diagrammatically shown in FIG. 49, assuming that, with no field, $θ_2$ is large and negative ($|θ_2|$>90° and $θ_2$<0, the point A in FIG. 49). In a field, $|θ_2|$ decreases (path ABC in FIG. 49) and the molecules move towards the $θ_2$+90° direction, which corresponds to the anchoring energy maximum and therefore to the zero anchoring moment. At the critical value $E_c$ of the field, the anchoring moment can no longer balance the electric moment and the surface becomes unstable: $θ_{s2}$ switches to the path CD (FIG. 49) and the molecules are now on the other side of the veritcal (FIG. 48d). If the field is now decreased gradually (in order to eliminate the hydrodynamic coupling), $θ_2$ follows the path DE (FIG. 49) and the final state of the system is the non-twisted texture in FIG. 48e—the half-turn is erased.

This erasure mechanism, discovered by the inventors, uses a breaking of the oblique anchoring on the slave plate 12 which is induced by the elastic interaction with the oblique master plate 10 and the initial texture. An initial texture may be erased by this mechanism only if it includes a planar region in the volume. On the other hand, in order to write such a texture, it is necessary to use other means, for example the hydrodynamic effect: the elastic breaking of the anchoring of the slave plate 12 is a transient and irreversible phenomenon, passage along the path CD (FIG. 49) being a one-way passage.

On the other hand, if the field is cut off before exceeding the point C, $θ_{s2}$ returns to A and the texture remains twisted after cutting off a field. This is because, if the field is too low to exceed the point C, rewriting occurs.

In order to demonstrate the utility of the oblique slave plates 12, the inventors prepared several thin specimens (d≅1.5 μm) with the oblique master plates 10 (evaporated SiO and an angle of inclination of the molecules with respect to this surface of approximately 35°) ($θ_2$=90−35=55°). The slave plates were prepared with different rubbed polymers ($α_2$, angle of inclination of between 2° and 10°).

In order to facilitate the writing of half-turns by means of the hydrodynamic coupling, a pretwist angle φ (between 0° and 90°) was imposed by rotating one of the plates with respect to the other. As already explained, this pretwist helps the hydrodynamic effect. The writing of half-turns was observed for φ close to 80° and with a voltage of 40–50 V. This difficulty in writing is due to the fact that the polymeric anchorings have a very high anchoring energy.

On the other hand, for all geometries, the inventors observed erasure, by elastic transient breaking, of those initial structures which include a planar region in the volume. The oblique slave plates can therefore be used to write and erase bistable volume textures on condition of having a low anchoring energy and a low inclination.

The two volume textures used in the devices described above are bistable: in the absence of an external field they cannot undergo a transition to another, lower-energy texture except by surface breaking or by defects. Therefore, in the absence of an external field and of any defects, each of the textures is stable for an infinitely long time by virtue of the topological incompatibility of the two textures.

However, in practice the two textures may have very different energies, especially in the case of nematic liquid crystals. This may create defects which move with greater or lesser rapidity, spontaneously erasing the high-energy texture and writing the other. This property may be undesirable in some applications, if a long memory time is required of the device.

Figure 50:
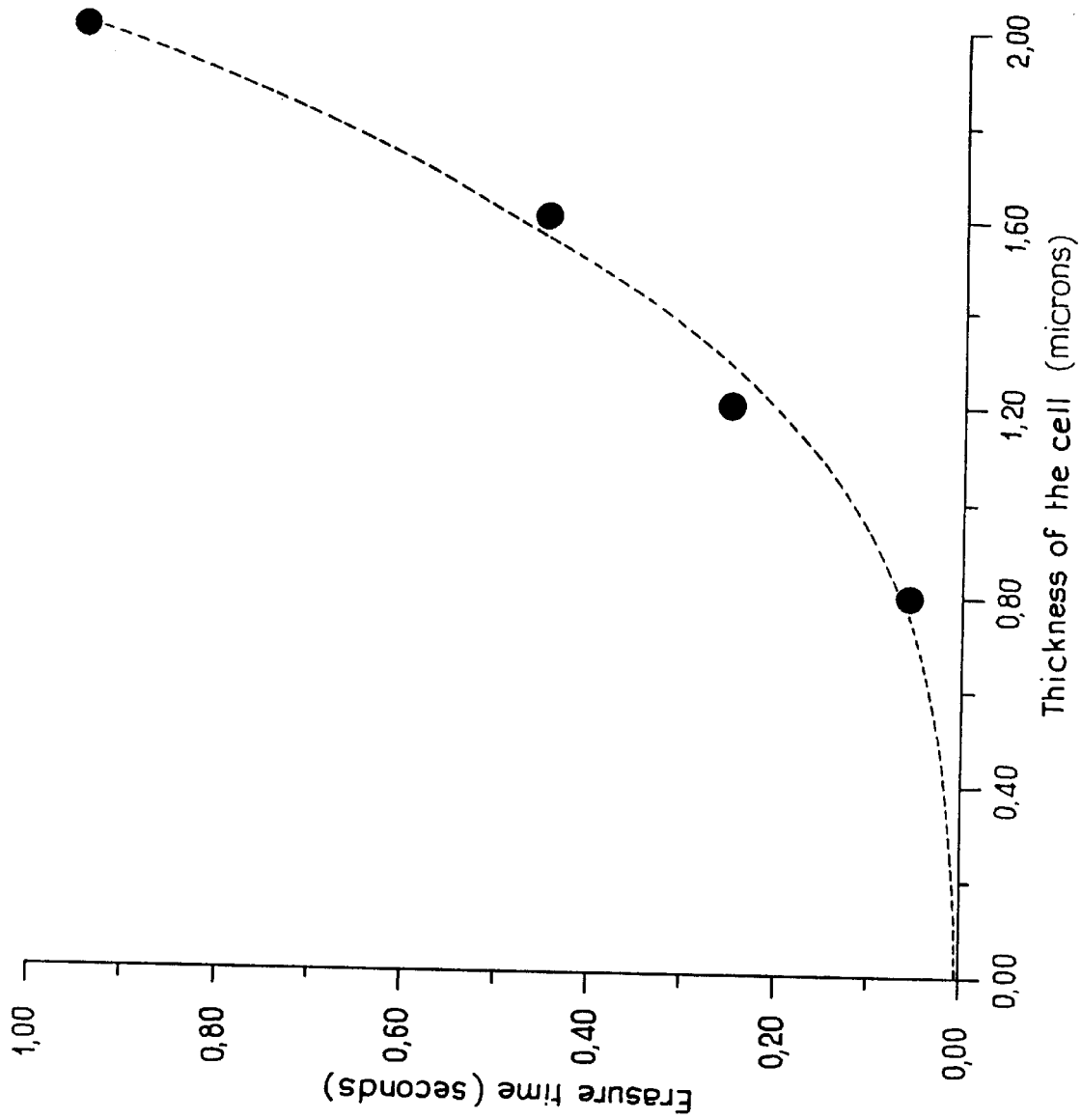
FIG. 50 represents the spontaneous erasure time as a function of the thickness of the cell.

The time for spontaneous erasure caused by movement of the defects depends on several parameters: thickness of the cell, dimensions of the pixel, chiral dopant, geometry (greater or lesser pretwist), etc. Some of these parameters may be adjusted in order to lengthen or shorten the spontaneous erasure time. For example, FIG. 50 shows the dependence of the spontaneous erasure time $\tau_s$ on the thickness of the cell ($2 \times 2$ mm$^2$ pixel, undoped 5CB nematic with a half-turn twist texture, which transforms into a uniform texture with no pretwist). It may be seen that the time $\tau_s$ changes with thickness over a wide range (from 0.1 to 1 second) and may be adjusted depending on the application. The spontaneous erasure time $\tau$ may also be controlled by the pretwist $\phi$ of the cell. At $\phi=90°$ for example, the energies of the two textures become equal and $\tau_s$ tends toward infinity.

However, the thickness and the pretwist are also important parameters in the case of field-induced surface transitions. It is therefore preferable to control $\tau_s$ by other means, in particular by the spontaneous twist induced in the nematic by adding a low concentration of cholesteric.

The inventors prepared several specimens with nematic-cholesteric mixtures in order to control the spontaneous erasure time $\tau_s$. FIG. 51 shows the optical behaviour of such a specimen when the half-turn (180° twist) texture is written and when it is erased (uniform texture, with no twist). The energies of the two textures were made almost equal by adding a few per cent of cholesteric. As a result, the time $\tau_s$ was extended to several hours; it is infinitely long compared to the scale of the figure.

The possibility of extending the spontaneous erasure time of the bistable textures by equalizing their energies has been described above. This makes it possible to use one of the main advantages of the bistability: after cutting off the field, the final texture is preserved indefinitely, or at least for a time $\tau_s$ which is very long compared to the refresh time of the device $\tau_r$, specific for each application. For some applications, $\tau_r$ is very long or ill-defined. For example, the display screen of some portable devices (mobile telephone, electronic personal organiser, electronic diary, etc.) must be refreshed as infrequently as possible in order to preserve the power. In such a case, it will be required for $\tau_e \rightarrow \infty$.

However, there are applications in which the very nature demand regular and frequent refreshing. For example, for video displays, a $\tau_r=20$–40 ms (image repetition time) is required. In this case, the bistable nematic displays already described may be used in a novel metastable mode. It will be shown later that such metastable-mode displays can have major advantages with respect to the usual devices.

Figure 52A:
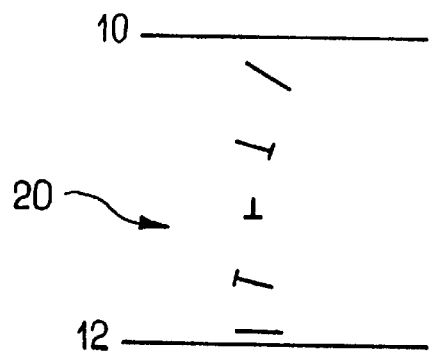
FIGS. 52A and 52B diagrammatically illustrate two different elastic-energy bistable textures respectively in half-turn twist mode and in non-twisted splay mode, with an oblique anchoring on one plate and planar anchoring on the other.
Figure 52B:
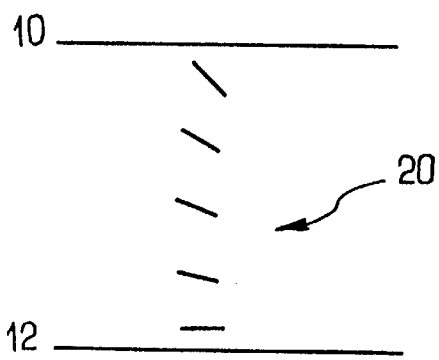

According to a first example, in order to produce this metastable operating mode, two bistable textures may be chosen (FIG. 52) one of which (FIG. 52A) has a field-free elastic energy which is much greater than the other (FIG. 52B). As a non-limiting example corresponding to an oblique anchoring on the plate 10 and a planar anchoring on the plate 12, the low-energy texture B in FIG. 52B is the twist-free slightly splayed texture and the texture A in FIG. 52A is the half-turn twist texture.

In the absence of an external electric field, the texture A is metastable: in a characteristic time $\tau_e$ it transforms into B by nucleation and propagation of defects. The time $\tau_e$ is adjusted to $\tau_e=\tau_r$, the refresh frequency, by controlling, for example, the density of the defect nucleation centres on the plates or by chiralization of the nematic. In such a way, the texture A, once written, self-erases after $\tau_r$, that is to say at the end of the image. In order to break the anchoring, only a single mechanism is now required, that which writes the texture A. For this example, the hydrodynamic coupling already described may be used.

Figure 53A:
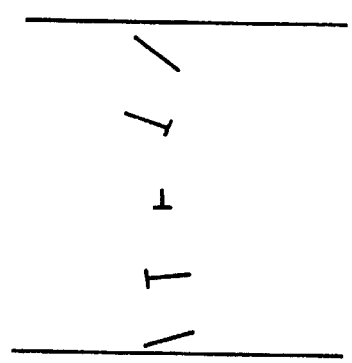
FIGS. 53A and 53B represent similar views for oblique anchorings on both plates.
Figure 53B:
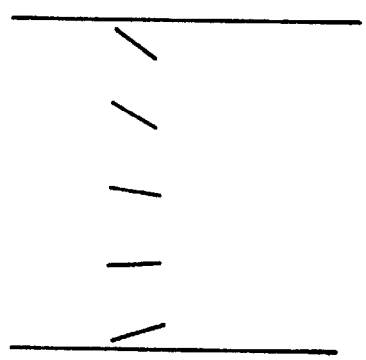

A second non-limiting example of a metastable-mode device is shown in FIG. 53. This time, opposite oblique anchoring is chosen on the two plates 10, 12 and the texture A may be written by the irreversible transient breaking of the anchoring on the slave plate 12. In a field $E>E_c$, the anchoring on the plate 12 breaks and $\theta_{s2}$ jumps to the other side of the bifurcation, as described already. In this specific case, the hydro-dynamic coupling and elastic coupling do not oppose each other but, on the other hand, help each other to write the texture A. Writing becomes very effective and rapid, and the threshold $E_c$ decreases.

The metastable anchoring-breaking displays described above have, in particular, the following advantages.

The metastable display preserves all the advantages of surface bistability, except the infinite memory, which in this case is limited to the time $\tau_e$. The write time $\tau_i$ is very short, typically $\cong 10$ $\mu$s for $U \cong 20$ volts.

A first advantage of the metastable display compared with the conventional nematic displays is its abrupt threshold.

Figure 54:
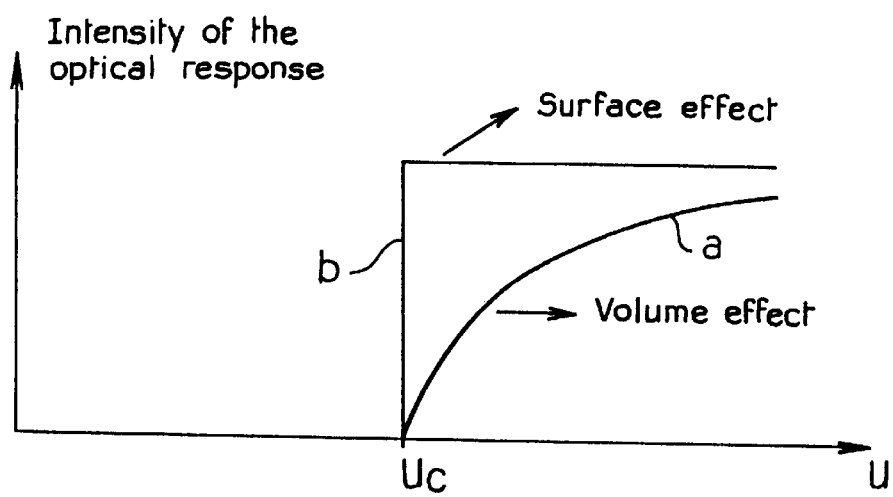
FIG. 54 diagrammatically represents the intensity of the optical response of the device as a function of the drive voltage for a customary volume device (curve a) and for the proposed device (curve b)

In a conventional display, a change in texture (and therefore an optical response) is produced by applying a strong short pulse. The optical response just after the pulse is plotted in FIG. 54 (curve a) as a function of the applied voltage. At $U<U_c$, the threshold voltage, no change in texture occurs. At $U>U_c$, and optical response, the amplitude of which increases with voltage, is obtained. The threshold is greatly spread out, of the to the gradual change-over in the textures, which pass, during and after the drive voltage, through a whole continuum of intermediate states. This spread greatly limits the multiplexing rate of continuous-response systems.

In the metastable displays in accordance with the present invention, the threshold UC is very abrupt (curve b in FIG. 54): there is no longer a progressive B→A change-over, and the display writes in "all or nothing" mode. No intermediate states exist which would impart a gradual nature to the optical response. Those skilled in the art know that such an abrupt threshold makes infinite multiplexing possible. This is a very important advantage compared with classical volume displays.

Figure 55:
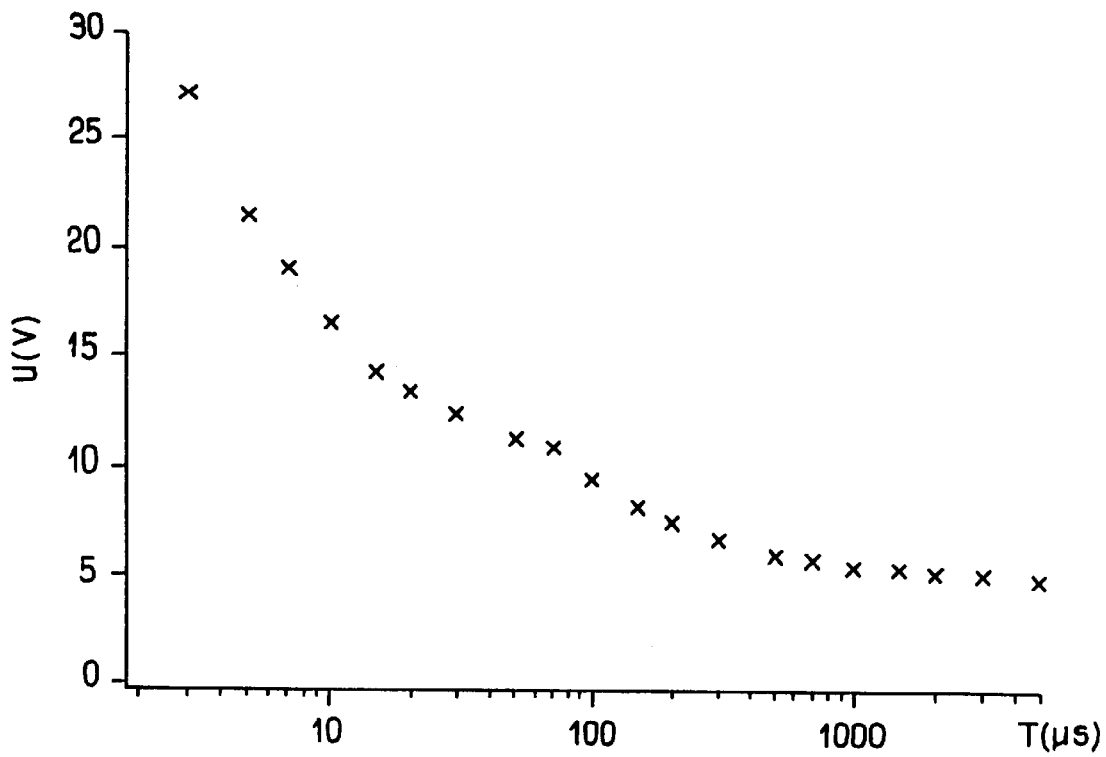
FIG. 55 represents the writing threshold as a function of the duration of the pulse.

Another advantage of the invention compared with nematic-liquid-crystal volume displays is the possibility of adjusting the erasure time $\tau_e$ depending on the application, without changing the duration and the voltage of the drive pulses. It is possible, for example, to control $\tau_e$ by the cholesteric doping or by the density of defect nucleation centres, independently of the surface breaking threshold. In contrast, in conventional nematic volume displays, a relationship exists between the write time $\tau_i$, the field-free erasure time $\tau_e$ and the threshold voltage $U_c$: $\tau_e = \tau_i U_c^2 / U_0^2$, or $U_0 \cong 1$ V for nematics with a high dielectric anisotropy. For rapid writing ($\tau_i \sim 10$ $\mu$s) and video-rate erasure ($\tau_e \sim 40$ ms), $U_c \cong 60$ V is obtained for a nematic volume display, compared to only $U_c \cong 15$ V for the metastable display of the invention (FIG. 55).

Figure 56:
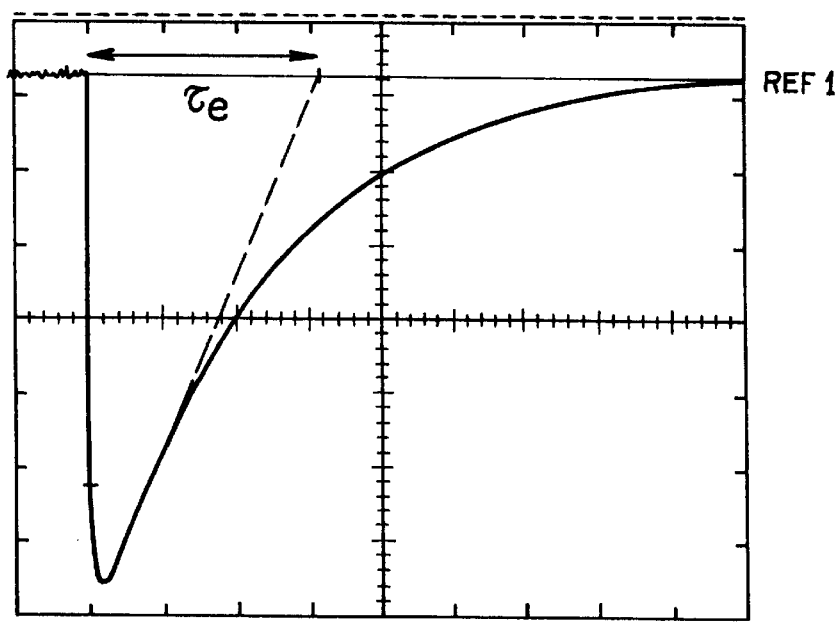
FIG. 56 represents the optical response of the device over time and illustrates, especially, a relatively short spontaneous erasure time.

The inventors have produced a cell in the geometry of FIG. 52 which corresponds to the first example mentioned above, with the undoped 5CB liquid crystal. The master plate 10 is oblique (SiO, grazing evaporation, $\theta_{s1} \cong 55°$) and the slave plate 12 is planar (SiO, $\theta_{s2} = 90°$). The thickness of the cell is defined by ball spacers (d=1.5 μm) placed on the planar plate 12. The texture A (twist half-turn) is written using short rectangular pulses. The very low write threshold in this cell (FIG. 55) confirms the effectiveness of the hydrodynamic control brought about by the oblique master plate 10. The spontaneous erasure occurs by nucleation of defects on the spacer balls, the density of which was chosen to be quite high in order to obtain a reasonably short erasure time $\tau_e \sim 300$ ms (FIG. 56).

In a second cell, which corresponds to the second example mentioned above, the inventors have tested the writing, using elastic breaking, in the geometry of FIG. 53. This cell, filled with pure 5CB, is thicker (d=3.3 μm) in order to demonstrate that the elastic effect does not depend critically on the thickness. The master plate 10 has a highly oblique anchoring (SiO, grazing evaporation, $\theta_{s1} \cong 55°$), while the slave plate 12, prepared by deposition of a thin film of PVA on the evaporated SiO, is slightly oblique ($\theta_{s2} \cong 86°$). Once again, the write threshold for the half-turn state is very low ($E_c=11$ V/μm for $\tau_r \sim 10$ μs), demonstrating the effectiveness of the elastic mechanism for anchoring breaking. For this thick cell, $\tau_e \sim 3$s is measured.

The methods of excitation in an alternating field, in accordance with the present invention, will not be explained in detail.

For practical reasons, liquid-crystal displays must preferably be driven by "alternating" signals such that the mean value of the applied voltage is as low as possible. This makes it possible to avoid the irreversible electrochemical effects which would limit the lifetime of the display. The inventors have demonstrated experimentally the equivalence of "polar" and "alternating" signals for causing surface breaking. This arises physically because of the fact that the volume moments transmitted to the surfaces are mainly of a dielectric origin ($\sim E^2$) and does not depend on the sign of the electric field.

By way of example, the inventors have shown the equivalence, in the case of writing, of a "polar" signal having an amplitude $V_p=13$ V and a duration $\tau=40$ μs, as illustrated in FIG. 57, with a square "alternating" signal having an amplitude very close to $V_a=13.4$ and the same duration, as illustrated in FIG. 58.

The same equivalence is observed for the erasure signals: a polar voltage $V'_p=5$ V and $\tau=240$ μs gives erasure while an alternating voltage of approximately $V'_a=5.3$ gives the same erasure.

The inventors have observed a small difference between two "alternating" signals of opposite phase, as illustrated in FIGS. 59 and 60. This difference arises from a small flexoelectric contribution to surface anchoring breaking. They observe, for example that the signal in FIG. 59, having $V_+=5.8$ and $\tau=240$ μs, writes the half-turn and that the signal $V_-$, having the same amplitude and same duration, in FIG. 60 causes erasure. This may make it possible in practice to use only the phase of alternating signals to cause surface breaking, as explained previously, by using the sign of polar signals.

(22) P. G. de Gennes, "The physics of Liquid Crystals", Clarendon Press, Oxford, 1974.

(23) Journal of Applied Physics, vol. 64, No. 2, pp 614–628, 1988, "Origin and characteristics of the optical properties of general twisted nematic liquid crystal displays" by H. L. Ong.

(24) Journal de Physique Lettres [*Journal of Physics Letters*], vol. 46, pp L195–L200, 1985, "Linear flexoelectro-optic effect in a hybrid aligned nematic liquid crystal cell" by N. V. Madhusudana and G. Durand.

(25) Europhysics Letters, vol. 5, No. 8, pp 697–702, 1988, "Order Electricity and Oblique Nematic Orientation on Rough Solid Surfaces" by M. Monkade, M. Boix and G. Durand.

What is claimed is:

1. Display device comprising two parallel transparent plates provided with electrodes on their internal surfaces and containing a nematic liquid-crystal material comprising:
    means defining a monostable anchoring on each plate;
        means breaking, on command, at least one of these anchorings, enabling the molecules to reorient transiently perpendicularly to the initial monostable anchoring direction; and
        means selecting after this breaking, either one of two different textures, both textures having the same monostable anchoring directions, so as to induce after this breaking, a bistable volume effect.

2. Device according to claim 1, wherein the anchoring breaking means are suitable for breaking the anchorings on both the plates.

3. Device according to claim 1, characterized in that the monostable anchorings are planar.

4. Device according to claim 1, wherein the monostable anchorings are homeotropic.

5. Device according to claim 1, wherein at least one of the monostable anchorings is oblique with respect to the plates.

6. Device according to claim 5, wherein it comprises means applying write electric-field pulses with an amplitude greater than the threshold for breaking the anchoring on the plate opposite the oblique anchoring master plate.

7. Device according to claim 6, wherein it comprises means applying an erasure electric field whose amplitude decreases gradually in order to get over, by default, the threshold for breaking the anchoring on the plate opposite the oblique anchoring master plate.

8. Device according to claim 6, wherein it comprises means applying an erasure electric field consisting of two successive steps: a first step markedly above the threshold for breaking the anchoring on the plate opposite the oblique anchoring master plate and the second step just slightly above this anchoring breaking threshold in order to limit the hydrodynamic effect during the cut-off of this second step.

9. Device according to claim 6, wherein the anchorings on the two plates have a pretwist in the off-state, favoring the hydrodynamic effect.

10. Device according to claim 1, characterized in that one of the anchorings is homeotropic and the other planar.

11. Device according to claim 1, characterized in that one of the anchorings is planar and the other oblique.

12. Device according to claim 1, characterized in that one of the anchorings is homeotropic and the other oblique.

13. Device according to claim 1, characterized in that the anchoring breaking means comprise means capable of applying an electric field.

14. Device according to claim 13, wherein the anchoring breaking means comprise means capable of applying an electric field perpendicular to the plates.

15. Device according to claim 14, characterized in that the anchoring is planar and the liquid crystal possesses a positive dielectric anisotropy.

16. Device according to claim 14, characterized in that the anchoring is homeotropic and the liquid crystal possesses a negative dielectric anisotropy.

17. Device according to claim 1, wherein the anchoring breaking means are suitable for placing the liquid crystal in an unstable situation in which the elastic energy of interaction of the liquid-crystal surface molecules with the surface of the plates is maximum.

18. Device according to claim 1, characterized in that the means inducing a bistable volume effect comprise means capable of applying a lateral electric field to the device.

19. Device according to claim 18, wherein the means inducing a bistable volume effect comprise interdigitated electrodes on one of the plates, facing the plate, the anchoring of which is broken, and means capable of applying a drive voltage to at least one of these electrodes, this being chosen alternately.

20. Device according to claim 18, wherein the means inducing a bistable volume effect comprise at least one electrode possessing at least one edge which is more conducting that its central part.

21. Device according to claim 18, characterized in that the means inducing a bistable volume effect comprise electrode along the edge of the device.

22. Device according to claim 1, characterized in that the means inducing a bistable volume effect comprise means capable of generating a hydrodynamic effect.

23. Device according to claim 18, characterized in that the means inducing a bistable volume effect comprise means capable of generating a shear on the liquid-crystal molecules close to the plate whose anchoring is broken.

24. Device according to claim 23, wherein:
the plates define different anchoring thresholds;
the thickness of the device between the two plates is sufficiently small to allow hydrodynamic coupling between the internal surfaces of the plates; and
means are provided which apply, between the electrodes of the two plates alternately, a write electric-field pulse above a threshold capable of breaking the anchorings on the two plates in order to define, after interruption of this electric field, a twisted first stable state resulting from hydrodynamic coupling between the two plates and a second electric field, below the said threshold capable of breaking a single anchoring or having a falling edge which varies very slowly in order to decouple the tilts on the two plates, so as to define a homogeneous second stable state.

25. Device according to claim 24, wherein the liquid-crystal material is a nematic liquid crystal.

26. Device according to claim 24, wherein the liquid-crystal material is a cholesteric liquid crystal.

27. Device according to claim 24, wherein the liquid-crystal material possesses a positive dielectric anisotropy.

28. Device according to claim 24, characterized in that the thickness (d) of the liquid-crystal material is less than $1/\theta_s$, in which expression:
1 denotes the extrapolation length defining the zenithal anchoring energy; and
$\theta_s$ denotes the angle of the surface molecules.

29. Device according to claim 24, characterized in that the thickness (d) of the liquid-crystal material satisfies the relationship: $d/1 < (\eta^2/K\rho)^{1/3}$ in which:
1 denotes the extrapolation length defining the zenithal anchoring energy;
$\eta$ denotes a viscosity;
K is the elastic curvature constant; and
$\rho$ is the density.

30. Device according to claim 24, characterized in that the thickness of the liquid-crystal material is less than $L/\theta_s$, in which expression L denotes the extrapolation length defining the azimuthal anchoring energy and $\theta_s$ denotes the angle of the surface molecules.

31. Device according to claim 24, wherein the thickness (d) of the liquid-crystal material is less than 5 $\mu$m.

32. Device according to claim 24, wherein the directions of easy anchoring on the two plates are not parallel to each other.

33. Device according to claim 24, wherein the directions of easy anchoring on the two plates are parallel to each other.

34. Device according to claim 24, wherein the directions of easy anchoring on the two plates are orthogonal to each other.

35. Device according to claim 24, wherein the directions of easy anchoring on the two plates are not orthogonal to each other.

36. Device according to claim 24, wherein the directions of easy anchoring on the two plates are rotated through approximately 45° or 135°.

37. Device according to claim 24, wherein it is formed into a matrix-configured screen consisting of rows and columns and in that the supply means are suitable for opening a row by applying to it a voltage slightly less than $V=E_0d$, the upper voltage threshold of the surface hardest to break and for applying to the columns a voltage $\pm v < \pm |E1-E2| d$, i.e., a voltage less than the difference in voltage between the thresholds of the two surfaces.

38. Device according to claim 37, characterized in that the voltage applied to the columns, averaged over time, is less than the Freedericksz instability threshold.

39. Device according to claim 24, wherein the surface treatments on the two plates are suitable for defining anchoring thresholds which differ by from 5 to 10%.

40. Device according to claim 24, characterized in that the anchoring thresholds depend on the polarity of the applied electric field.

41. Device according to claim 24, wherein the liquid-crystal material is doped by ions which make it possible to modify the tilt thresholds of the molecules on at least one of the plates.

42. Device according to claim 41, characterized in that the ions are chosen from the group comprising sodium tetraphenylborate, tetrabutylammonium chloride and cetyltributylammonium bromide.

43. Device according to claim 24, characterized in that the fall time of the write drive voltage is less than 30 $\mu$s.

44. Device according to claim 24, characterized in that the fall time of the erasure drive voltage is greater than 30 $\mu$s.

45. Device according to claim 24, wherein the electrical drive means are suitable for applying an alternating electrical voltage.

46. Device according to claim 23, characterized in that the means inducing a bistable volume effect comprise means capable of producing a mechanical displacement of at least one part of the plate, for example by using a piezoelectric system or by using sound waves.

47. Device according to claim 23, characterized in that the means inducing a bistable volume effect comprise means capable of ensuring a mechanical transverse stress to the plates.

48. Device according to claim 23, characterized in that the means inducing a bistable volume effect comprise means which include an auxiliary electrode (c) placed alongside an electrode (p) defining a pixel.

49. Device according to claim 48, characterized in that the anchoring is oblique on the auxiliary electrode (c) and is provided with means selectively applying a drive field to the auxiliary electrode at the moment when the electric field on the pixel electrode (p) is cut off or a drive field to the auxiliary electrode at the same time as the electric field on the pixel electrode (p).

50. Device according to claim 22, wherein the means inducing a bistable volume effect comprise means defining a hydrodynamic coupling between the two plates.

51. Device according to claim 1, characterized in that the means for anchoring breaking and for bistable volume switching are suitable for homogeneously driving the entire surface of a pixel.

52. Device according to claim 1, characterized in that at least one of the means for anchoring breaking and for bistable volume switching is suitable for driving a variable part of a pixel.

53. Device according to claim 1, wherein the anchorings are oblique on the two plates.

54. Device according to claim 53, wherein the angle of inclination of the anchoring is large on a master plate and lower for a slave plate.

55. Device according to claim 54, characterized in that the texture of the LCD molecules includes a volume planar zone, and in that the device includes means capable of applying electric-field pulses with an amplitude greater than the irreversible breaking threshold in order to convert the stable texture having a volume planar zone into another stable texture.

56. Device according to claim 53, wherein it comprises means applying write electric-field pulses with an amplitude greater than the threshold for breaking the anchoring on both the plates.

57. Device according to claim 53, wherein it comprises means applying an erasure electric field with an amplitude greater than the threshold for breaking the anchoring on an oblique anchoring slave plate.

58. Device according to claim 1, characterized in that parameters such as thickness of the cell, dimensions of the pixel, chiral dopant and pretwist are suitable for defining a desired spontaneous erasure time.

59. Device according to claim 58, wherein the anchorings on the two plates are twisted through 90°.

60. Device according to claim 58, characterized in that the liquid crystal comprises a nematic/cholesteric mixture.

61. Device according to claim 1, wherein, for a metastable operation, the anchorings on the plates define two textures in the absence of a field, one having an elastic energy much greater than the other.

62. Device according to claim 61, wherein the two textures correspond to an oblique anchoring on one plate and a planar anchoring on the other.

63. Device according to claim 61, characterized in that the two textures correspond to oblique anchorings on each of the plates.

64. Device according to claim 61, characterized in that the two textures correspond one to a slightly splayed non-twisted texture and the other to a half-turn twist texture.

65. Device according to claim 61, wherein it comprises ball spacers between the plates favouring the nucleation of defects.

* * * * *

UNITED STATES PATENT AND TRADEMARK OFFICE
CERTIFICATE OF CORRECTION

PATENT NO. : 6,327,017 B2
DATED : December 4, 2001
INVENTOR(S) : Barberi et al.

It is certified that error appears in the above-identified patent and that said Letters Patent is hereby corrected as shown below:

<u>Title page,</u>
Item [74], *Attorney, Agent, or Firm*, please delete "Kokoloff" and insert -- Sokoloff --.

<u>Columns 22-26,</u>
Please delete "characterized in that" and insert -- wherein --. (each occurrence)

<u>Column 23,</u>
Line 20, please delete "electrode" and insert -- electrodes --.
Line 25, please delete "claim 18" and insert -- claim 22 --.

Signed and Sealed this

Eighteenth Day of May, 2004

JON W. DUDAS
*Acting Director of the United States Patent and Trademark Office*